(12) United States Patent
Uchiyama et al.

(10) Patent No.: US 11,064,493 B2
(45) Date of Patent: *Jul. 13, 2021

(54) COMMUNICATION CONTROL APPARATUS, COMMUNICATION CONTROL METHOD, RADIO COMMUNICATION APPARATUS, AND RADIO COMMUNICATION METHOD

(71) Applicant: Sony Corporation, Tokyo (JP)

(72) Inventors: Hiromasa Uchiyama, Kanagawa (JP); Ryo Sawai, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,847

(22) Filed: Apr. 29, 2019

(65) Prior Publication Data

US 2019/0254036 A1    Aug. 15, 2019

Related U.S. Application Data

(63) Continuation of application No. 14/916,424, filed on Mar. 3, 2016, now Pat. No. 10,314,042, which is a
(Continued)

(30) Foreign Application Priority Data

Sep. 25, 2013   (JP) ................................ 2013-198022

(51) Int. Cl.
*H04W 72/04*   (2009.01)
*H04W 52/38*   (2009.01)
(Continued)

(52) U.S. Cl.
CPC ........ *H04W 72/0473* (2013.01); *H04B 17/11* (2015.01); *H04B 17/345* (2015.01);
(Continued)

(58) Field of Classification Search
None
See application file for complete search history.

(56) References Cited

U.S. PATENT DOCUMENTS 10,314,042 B2 *  6/2019  Uchiyama ............ H04B 17/345
2007/0133483 A1  6/2007  Lee et al.
(Continued)

FOREIGN PATENT DOCUMENTS

CN     101322327 A    12/2008
CN     101960737 A     1/2011
(Continued)

OTHER PUBLICATIONS

Japanese Office Action dated Jul. 31, 2018 in Japanese Application No. 2015-538969.
(Continued)

*Primary Examiner* — Brian S Roberts
(74) *Attorney, Agent, or Firm* — Xsensus, LLP

(57) ABSTRACT

[Object] To be able to utilize radio resources more efficiently in the environment where a small cell is operated.
[Solution] Provided is a communication control apparatus including: a communication unit configured to communicate with a radio communication apparatus being connected to a base station via a radio backhaul link and being connected to one or more terminals via an access link; and a control unit configured to, when a reception on the radio backhaul link and a transmission on the access link, or a reception on the access link and a transmission on the radio backhaul link are executed on an identical channel simultaneously in the radio communication apparatus, adjust a power ratio between a reception signal and a transmission signal in order to support the radio communication apparatus in removing self-interference due to a sneak of the transmission signal from the reception signal.

13 Claims, 19 Drawing Sheets

Related U.S. Application Data continuation of application No. PCT/JP2014/068228, filed on Jul. 8, 2014.

(51) Int. Cl.
| | | |
|---|---|---|
| *H04W 52/24* | (2009.01) | |
| *H04B 17/11* | (2015.01) | |
| *H04B 17/345* | (2015.01) | |
| *H04W 52/46* | (2009.01) | |
| *H04W 16/32* | (2009.01) | |
| *H04W 92/20* | (2009.01) | |
| *H04B 1/525* | (2015.01) | |

(52) U.S. Cl.
CPC ......... *H04W 52/243* (2013.01); *H04W 52/38* (2013.01); *H04W 52/46* (2013.01); *H04W 72/0453* (2013.01); *H04B 1/525* (2013.01); *H04W 16/32* (2013.01); *H04W 92/20* (2013.01)

(56) References Cited

U.S. PATENT DOCUMENTS

| | | | |
|---|---|---|---|
| 2008/0227461 A1 | 9/2008 | Dayal et al. | |
| 2008/0274692 A1 | 11/2008 | Larsson | |
| 2009/0197588 A1 | 8/2009 | Khandekar et al. | |
| 2010/0034135 A1* | 2/2010 | Kim | H04W 72/0446 370/315 |
| 2010/0265842 A1* | 10/2010 | Khandekar | H04L 25/0202 370/252 |
| 2011/0038283 A1* | 2/2011 | Yu | H04W 28/16 370/277 |
| 2011/0170460 A1 | 7/2011 | Chayat et al. | |
| 2011/0292843 A1* | 12/2011 | Gan | H04B 7/15557 370/277 |
| 2011/0312267 A1* | 12/2011 | Oh | H04W 28/08 455/7 |
| 2012/0028673 A1 | 2/2012 | Jeong | |
| 2012/0063369 A1* | 3/2012 | Lin | H04W 72/082 370/279 |
| 2012/0106405 A1 | 5/2012 | Lioliou et al. | |
| 2012/0250603 A1* | 10/2012 | Huang | H04W 72/0486 370/315 |
| 2012/0276859 A1* | 11/2012 | Callender | H04B 1/1036 455/77 |
| 2012/0309291 A1 | 12/2012 | Sawai | |
| 2013/0273834 A1* | 10/2013 | Sundstrom | H04B 15/00 455/7 |

FOREIGN PATENT DOCUMENTS

| | | |
|---|---|---|
| JP | 2002-204470 A | 7/2002 |
| JP | 2009-517918 A | 4/2009 |
| JP | 2010-068151 A | 3/2010 |
| JP | 2010-521927 A | 6/2010 |
| JP | 2013-046398 A | 3/2013 |
| WO | 2007/064249 A1 | 6/2007 |
| WO | 2007/065365 A1 | 6/2007 |

OTHER PUBLICATIONS

Office Action and Search Report issued in Chinese Application 201480051460.5 dated Sep. 28, 2018.
Written Opinion dated Jun. 8, 2017 in Singaporean Patent Application No. 11201602073V.
"5G Radio Access: Research and Vision" Ericsson White Paper, 284 23-3204 Uen, Jun. 2013, pp. 1-9.
"Text Proposal for TR36.923 on Small Cell Enhancement Scenarios", NTT DOCOMO, R1-130748, Jan. 28-Feb. 1, 2013, pp. 1-5.
Achaleshwar Sahai, et al, "Pushing the limits of Full-duplex: Design and Real-time Implementation" Department of Electrical and Computer Engineering Rice University, Technical Report TREE1104, Jul. 4, 2011, pp. 1-12.
International Search Report dated Oct. 7, 2014 for PCT/JP2014/068228 filed on Jul. 8, 2014.
Extended European Search Report dated Apr. 13, 2017 in Patent Application No. 14848438.9.

\* cited by examiner

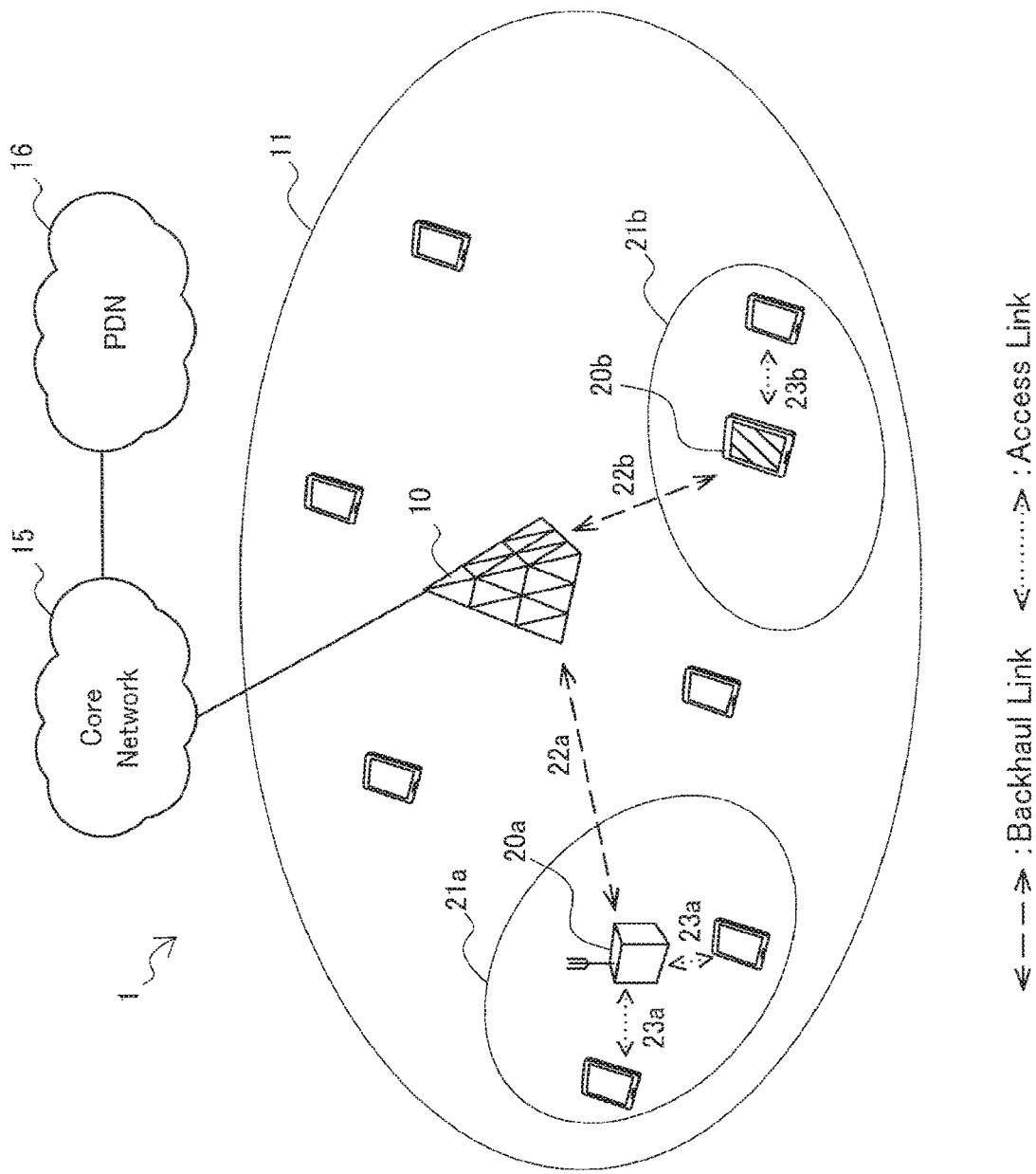

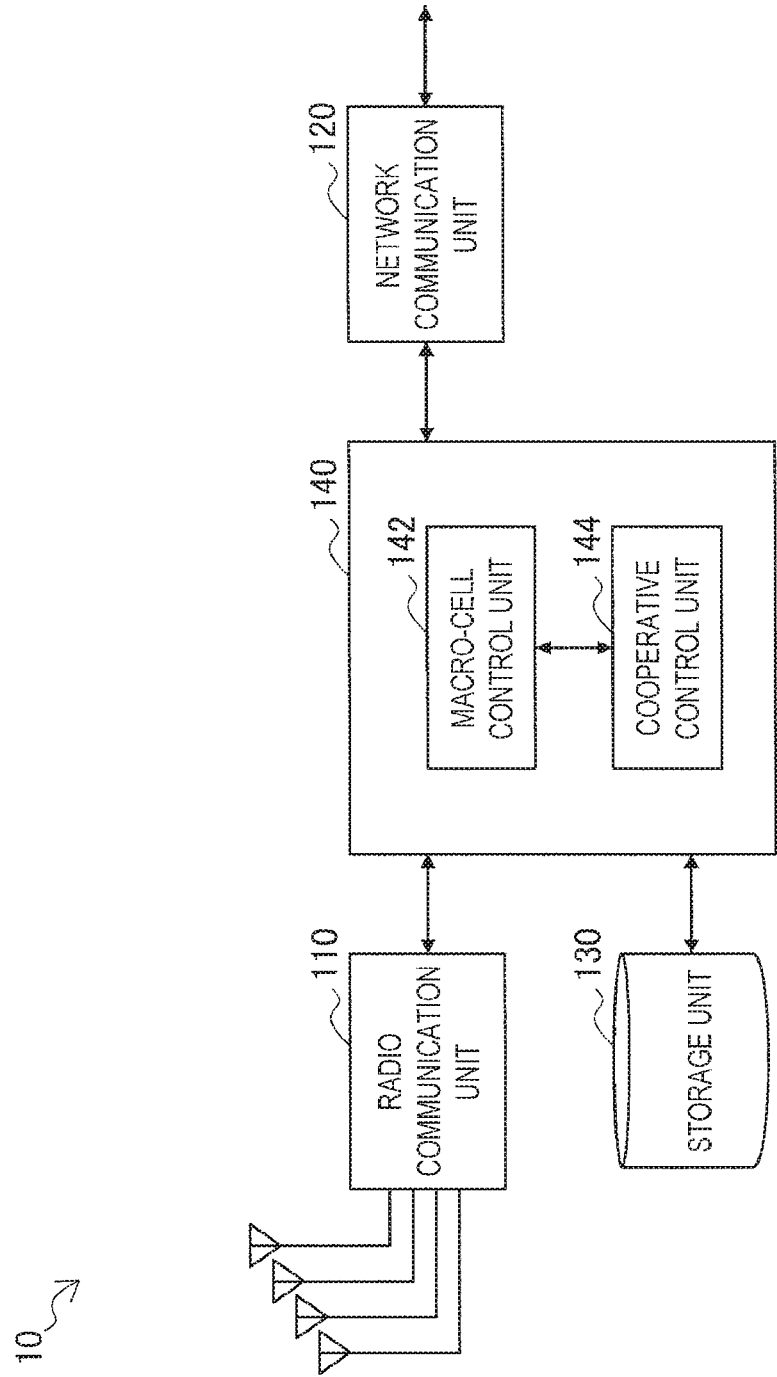

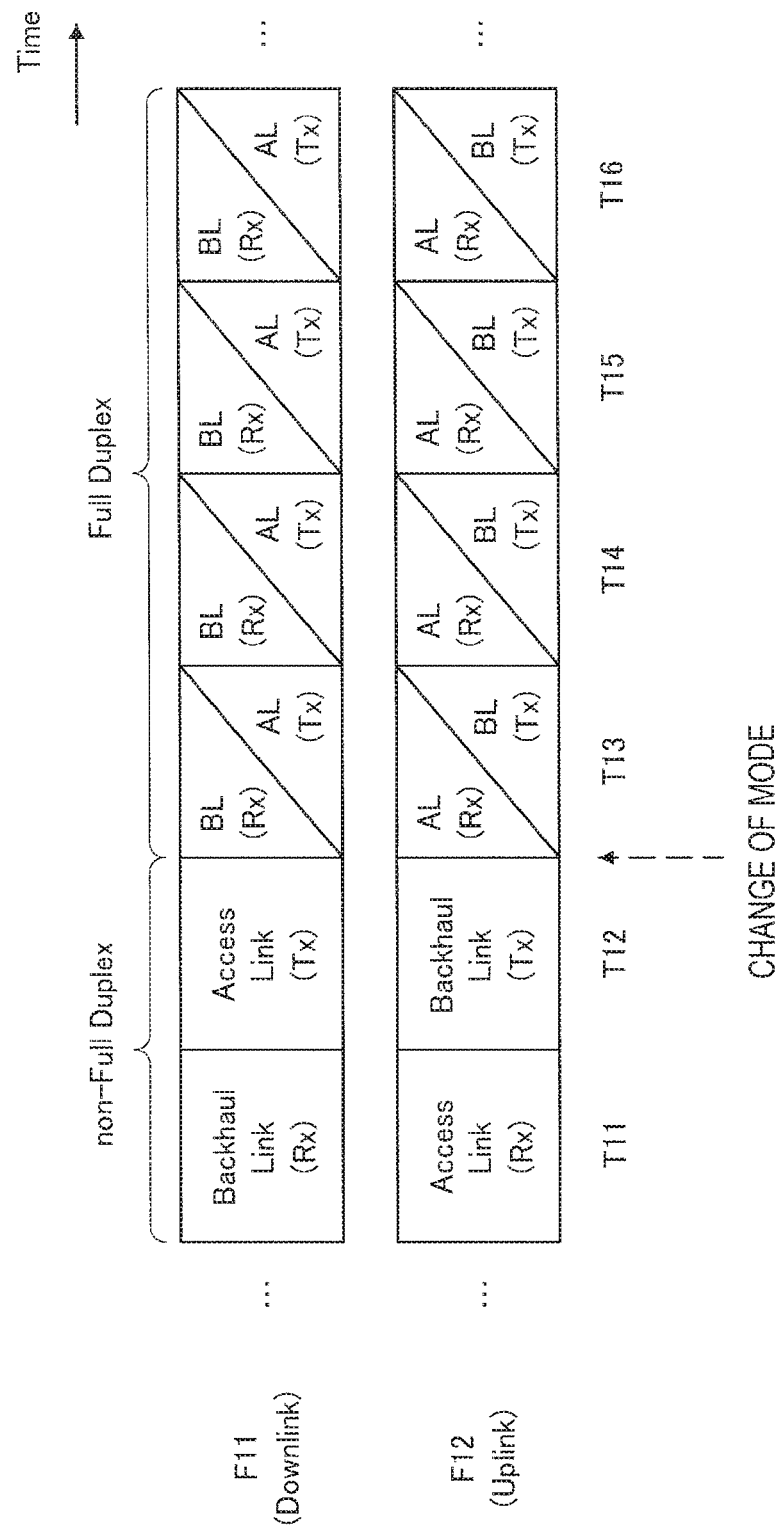

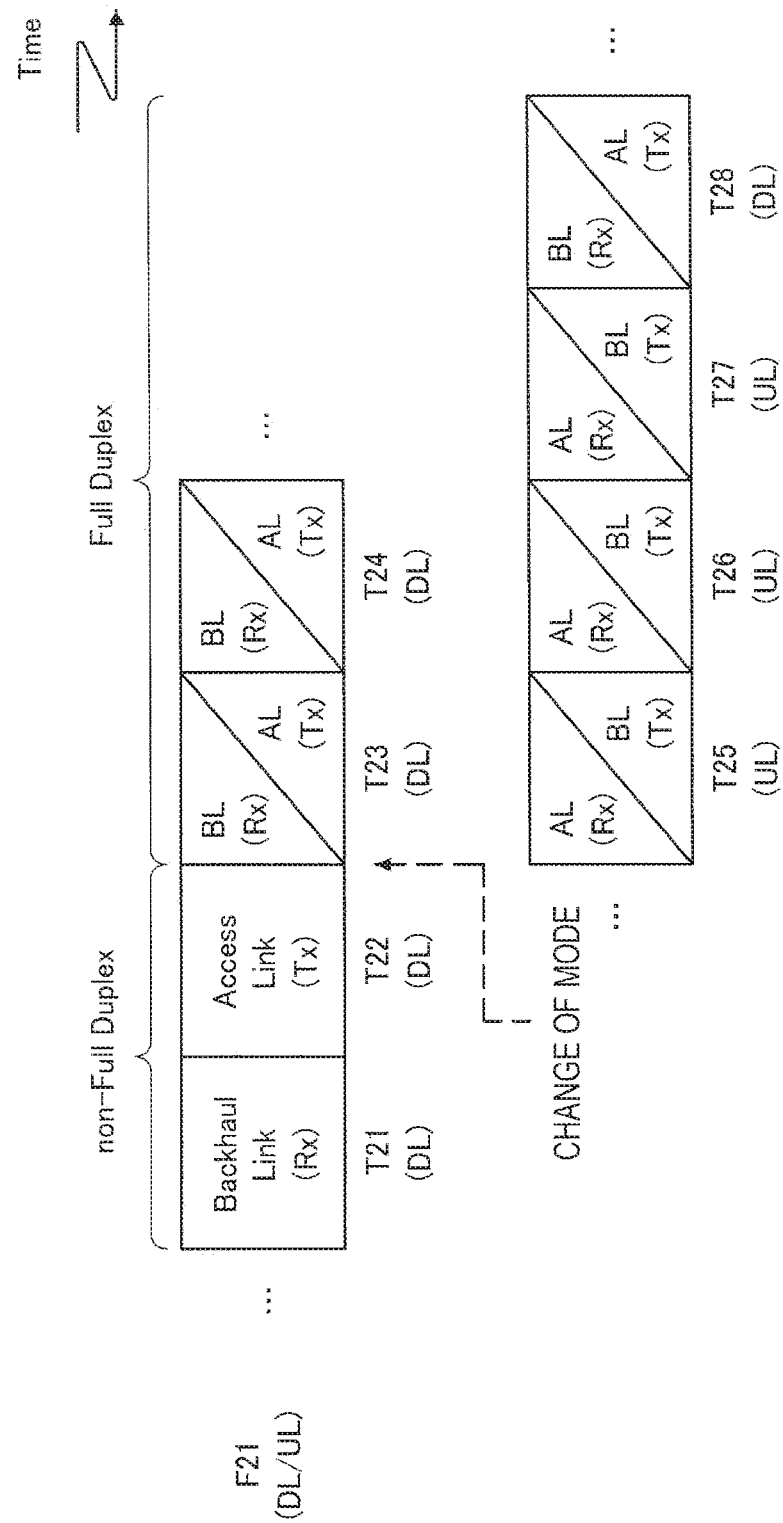

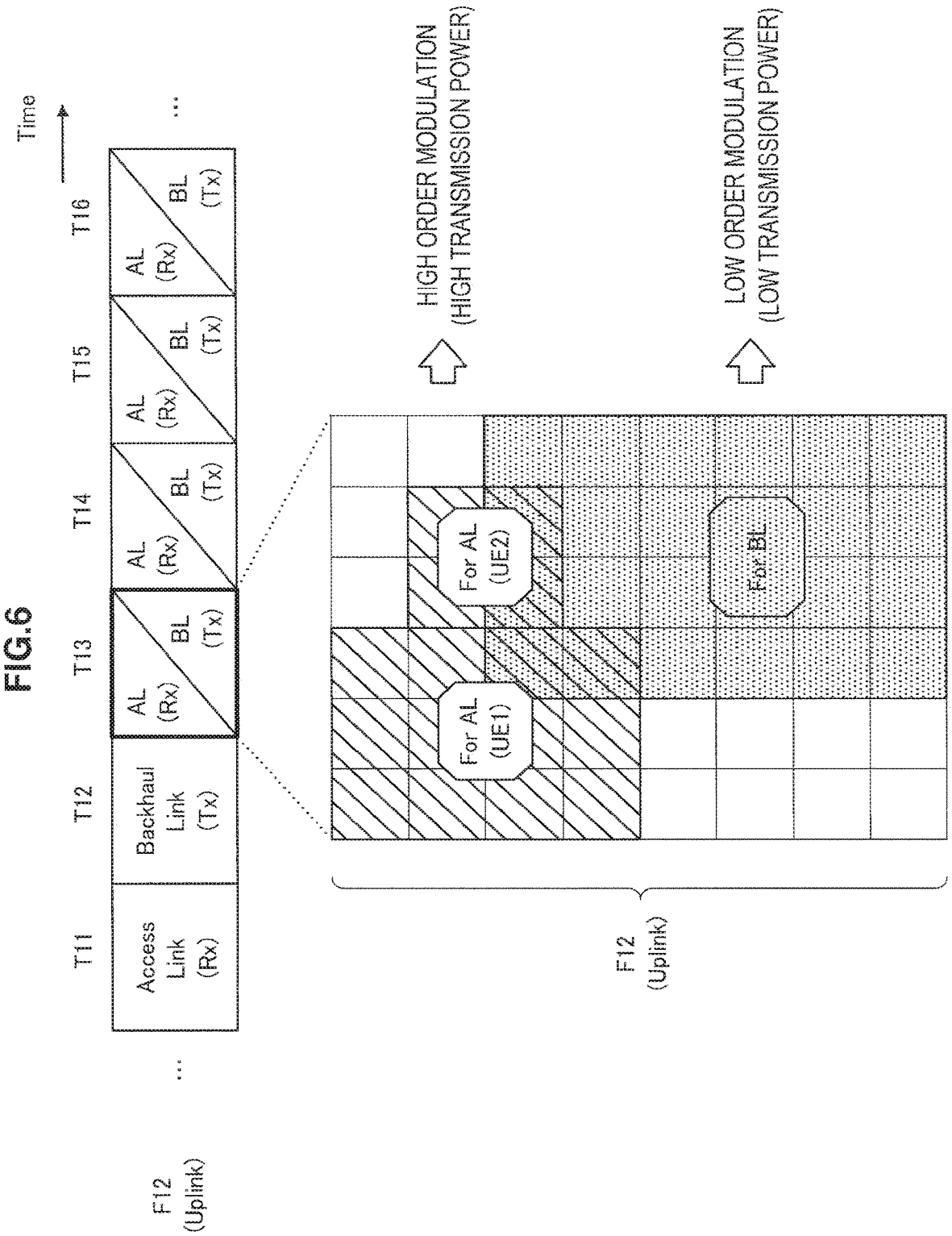

COMMUNICATION CONTROL APPARATUS, COMMUNICATION CONTROL METHOD, RADIO COMMUNICATION APPARATUS, AND RADIO COMMUNICATION METHOD

CROSS-REFERENCE TO RELATED APPLICATIONS

The present application is a continuation of U.S. application Ser. No. 14/916,424, filed Mar. 3, 2016, which is based on PCT filing PCT/JP2014/068228, filed Jul. 8, 2014, and claims priority to JP 2013-198022, filed Sep. 25, 2013, the entire contents of each are incorporated herein by reference.

TECHNICAL FIELD

The present invention relates to a communication control apparatus, a communication control method, a radio communication apparatus, and a radio communication method.

BACKGROUND ART

Recent radio communication environment has been faced with the problem of rapid increase in data traffic. Thus, in 3GPP, such traffic is considered to be dispersed by increasing the density in a network in which a plurality of small cells are placed in a macro cell as disclosed in Non-Patent Literature 1 mentioned below. The technique of using such small cells is known as small cell enhancement. In the proposal of the 5G wireless communication scheme, an ultra-high density network (ultra-dense network) using a higher frequency and broader band than the existing network as disclosed in Non-Patent Literature 2 mentioned below is expected to be introduced.

The small cells are concepts that can include various kinds of cells (e.g. femtocell, nanocell, picocell, and microcell), which are arranged to be overlapped with the macro cell, smaller than the macro cell. In one example, the small cells are operated by a dedicated base station. In another example, the small cells are operated by allowing a terminal serving as a master device to operate temporarily as a small-cell base station. The so-called relay node can also be considered as a form of the small-cell base station. In the environments in which small small cells are operated, efficient use of radio resources and provision of low cost devices are important aspects.

The small-cell base station typically relays traffic between a macro-cell base station and a terminal. A link between the small-cell base station and the macro-cell base station is referred to as a backhaul link. Additionally, a link between the small-cell base station and a terminal is referred to as an access link. When the backhaul link is a radio link, by operating a radio backhaul link and an access link in a time division scheme, radio signals from these links can be prevented from interfering with each other.

CITATION LIST

Non-Patent Literature

Non-Patent Literature 1: NTT DOCOMO, "Text proposal for TR36.923 on Small Cell Enhancement Scenarios", 3GPP TSG RAN WG1 Meeting #72, R1-130748, Jan. 28 to Feb. 1, 2013
Non-Patent Literature 2: Ericsson, "ERICSSON WHITE PAPER: 5G RADIO ACCESS", June 2013, [online], search result in Aug. 26, 2013, Internet <URL: http://www.ericsson.com/res/docs/whitepapers/wp-5g.pdf>
Non-Patent Literature 3: Achaleshwar Sahai, Gaurav Patel, Ashutosh Sabharwal, "Pushing the limits of Full-duplex: Design and Real-time Implementation", arXiv: 1107.0607, Mon, 4 Jul. 2011

Patent Literature

Patent Literature 1: JP 2010-068151A

SUMMARY OF INVENTION

Technical Problem

However, when the radio backhaul link and the access link are operated in the time division scheme in a small-cell base station, the latency for relaying traffic will be increased, which leads to reduction in the use efficiency of radio resources. In addition, the memory size necessary for a small-cell base station to buffer the traffic will be increased. To solve this, an idea of full-duplex radio communications is introduced to the small-cell base station to allow the radio backhaul link and the access link to be operated simultaneously on the same channel as disclosed in Non-Patent Literature 3, thereby utilizing efficiently radio resources. In the small-cell base station, the self-interference due to leak of transmission signals can be removed by applying the self-interference cancellation (SIC) technique as disclosed in Non-Patent Literature 3. However, when the ratio of power of an interference signal to power of a desired signal is not small, the self-interference is not sufficiently removed by the SIC technique, and thus the full-duplex radio communication does not function well.

An object of the technology according to the present disclosure is to achieve a mechanism to address at least one of the above-mentioned problems and to utilize radio resources more efficiently in the environment where a small cell is operated.

Solution to Problem

According to the present disclosure, there is provided a communication control apparatus including: a communication unit configured to communicate with a radio communication apparatus being connected to a base station via a radio backhaul link and being connected to one or more terminals via an access link; and a control unit configured to, when a reception on the radio backhaul link and a transmission on the access link, or a reception on the access link and a transmission on the radio backhaul link are executed on an identical channel simultaneously in the radio communication apparatus, adjust a power ratio between a reception signal and a transmission signal in order to support the radio communication apparatus in removing self-interference due to a leak of the transmission signal from the reception signal.

According to the present disclosure, there is provided a communication control method including: adjusting a power ratio between a reception signal and a transmission signal in a processor of a communication control apparatus communicating with a radio communication apparatus in order to support the radio communication apparatus in removing self-interference due to a leak of the transmission signal from the reception signal when a reception on a radio backhaul link and a transmission on an access link, or a reception on the access link and a transmission on the radio backhaul link are executed on an identical channel simultaneously in the radio communication apparatus being connected to a base station via the radio backhaul link and being connected to one or more terminals via the access link.

According to the present disclosure, there is provided a communication control apparatus including: a radio communication unit configured to communicate with a base station via a radio backhaul link and to communicate with one or more terminals via an access link; a self-interference processing unit configured to, when a reception on the radio backhaul link and a transmission on the access link, or a reception on the access link and a transmission on the radio backhaul link are executed on an identical channel simultaneously in the radio communication unit, remove self-interference due to a leak of a transmission signal from a reception signal; and a control unit configured to allow the radio communication unit to use a power ratio between the reception signal and the transmission signal, the power ratio being adjusted in order to support removal of the self-interference.

According to the present disclosure, there is provided a communication control method including: executing a reception on a radio backhaul link and a transmission on an access link, or a reception on the access link and a transmission on the radio backhaul link on an identical channel simultaneously in a radio communication apparatus being configured to communicate with a base station via the radio backhaul link and to communicate with one or more terminals via the access link; and removing self-interference due to a leak of a transmission signal from a reception signal. A power ratio between the reception signal and the transmission signal is adjusted in such a way that the self-interference is removable from the reception signal.

Advantageous Effects of Invention

According to the technology according to the present disclosure, it is possible to utilize radio resources more efficiently in the environment where a small cell is operated.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrated to describe an overview of a communication control system according to one embodiment.

FIG. 3 is a block diagram illustrating an example of the logical configuration of a communication control apparatus according to one embodiment.

FIG. 4 is an explanatory diagram illustrated to describe a first example of the distribution of radio resources to a backhaul link and an access link.

FIG. 5 is an explanatory diagram illustrated to describe a second example of the distribution of radio resources to the backhaul link and the access link.

FIG. 6 is an explanatory diagram illustrated to describe an example of the detailed distribution of radio resources in a subframe in which radio communication is performed in the FD mode.

DESCRIPTION OF EMBODIMENTS

Figure 2A:
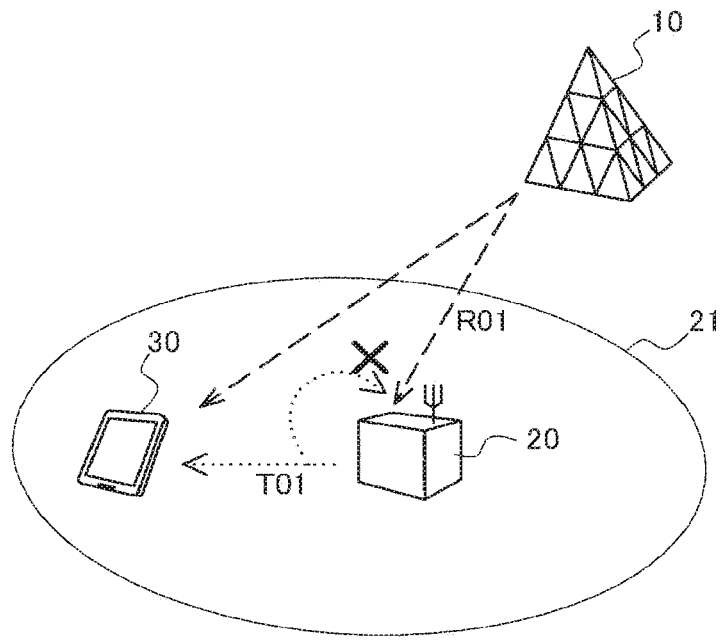
FIG. 2A is an explanatory diagram illustrated to describe the self-interference in the FD mode of a downlink.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. Overview of System
 1-1. Introduction of Small Cell
 1-2. Use of Full Duplex (FD) Mode
2. Exemplary Configuration of Communication Control Apparatus
 2-1. Description of Components
 2-2. FD Mode
 2-3. Non-FD Mode
3. Exemplary Configuration of Radio Communication Apparatus
 3-1. Description of Components
 3-2. Operation as Slave Device
4. Procedure of Process
 4-1. Communication Control Process
 4-2. FD Determination Process
 4-3. Power Ratio Adjusting Process
 4-4. Modified Example
5. Application Examples
 5-1. Application Example regarding Cooperative Control Node
 5-2. Application Example regarding Base Station
 5-3. Application Example regarding Terminal Device
6. Conclusion

Overview of System

1-1. Introduction of Small Cell

FIG. 1 is an explanatory diagram illustrated to describe an overview of a communication control system 1 according to one embodiment of the technology according to the present disclosure. The communication control system 1 is configured to include a communication control apparatus 10 and radio communication apparatuses 20a and 20b.

The communication control apparatus 10 is a device for cooperatively controlling radio communication in a macro cell and a small cell. In the example of FIG. 1, the communication control apparatus 10 is a macro-cell base station. The macro-cell base station 10 provides a radio communication service for one or more terminal devices located within the macro cell 11. The macro-cell base station 10 is connected to a core network 15. The core network 15 is connected to a packet data network (PDN) 16 via a gateway device (not shown). The macro cell 11 may be operated in accordance with any radio communication scheme, for example, such as long-term evolution (LTE), LTE-Advanced (LTE-A), GSM, UMTS, W-CDMA, CDMA200, WiMAX, WiMAX2, and IEEE802.16. It is not limited to the example of FIG. 1, a control node (a higher node of the macro-cell base station) within the core network 15 or the PDN 16 may have the ability to cooperatively control the radio communication in the macro cell and the small cell.

The radio communication apparatuses 20a and 20b are respectively master devices for operating a small cell. As one example, the radio communication apparatus 20a is a small-cell base station provided fixedly. The small-cell base station 20a establishes a radio backhaul link 22a with the macro-cell base station 10 and establishes an access link 23a with one or more terminal devices within the small cell 21a. The radio communication apparatus 20b is a dynamic access point (AP). The dynamic AP 20b is a mobile device for dynamically operating the small cell 21b. The dynamic AP 20b establishes a radio backhaul link 22b with the macro-cell base station 10 and establishes an access link 23b with one or more terminal devices within the small cell 21b. The dynamic AP 20b may be a terminal device equipped with hardware or software that can be operated, for example, as a base station or a radio access point. The small cell 21b in this case is a localized network that is formed dynamically. The radio communication apparatuses 20a and 20b typically have a right to allocate radio resources to a terminal device connected to its own apparatus. However, in the present embodiment, the allocation of radio resources is cooperatively controlled, and thus it is authorized, at least partially, to the communication control apparatus 10.

When there is no necessity to distinguish between the radio communication apparatuses 20a and 20b herein, they will be collectively referred to as a radio communication apparatus 20 by omitting the suffix in the form of alphabet of the reference signs. This is similarly applied to the components (the small cell 21, the radio backhaul link 22, the access link 23, or the like). The radio communication apparatus 20 may be any type of master device such as a relay station for relaying a radio signal in the layer 1, layer 2, or layer 3 without being limited to the example of FIG. 1. Additionally, the radio communication apparatus 20 may have, for example, a separate wired backhaul link for control, in addition to the radio backhaul link 22.

1-2. Use of Full Duplex (FD) Mode

The radio communication apparatus 20 receives downlink traffic that is directed to a terminal device within the small cell 21 as a destination via the radio backhaul link 22, and transmits the received traffic to the terminal device as a destination via the access link 23. In addition, the radio communication apparatus 20 receives uplink traffic received from the terminal device within the small cell 21 via the access link 23 and transmits the received traffic via the radio backhaul link 22. When the reception on the radio backhaul link 22 and the transmission on the access link 23 or the reception on the access link 23 and the transmission on the radio backhaul link 22 are executed in a time division scheme, the reception signal and the transmission signal do not interfere with each other in the radio communication apparatus 20. However, the operation in such time division scheme increases the latency for relaying the traffic. The memory size necessary for the master device to buffer the traffic will also be increased. In addition, it is also possible to avoid the interference between the reception signal and the transmission signal described above by allocating different frequency channels to the radio backhaul link and the access link. However, the operation in such frequency division scheme can be employed only in the condition that available frequency resources are sufficient. Both the schemes are difficult to achieve the optimization of utilization efficiency of radio resources. Thus, in the present embodiment, the full duplex (FD) mode is introduced to use radio resources more efficiently. In the FD mode, in the downlink, the reception on the radio backhaul link 22 and the transmission on the access link 23 are executed simultaneously on the same channel. In the uplink, the reception on the access link 23 and the transmission on the radio backhaul link 22 are executed simultaneously on the same channel.

Figure 2B:
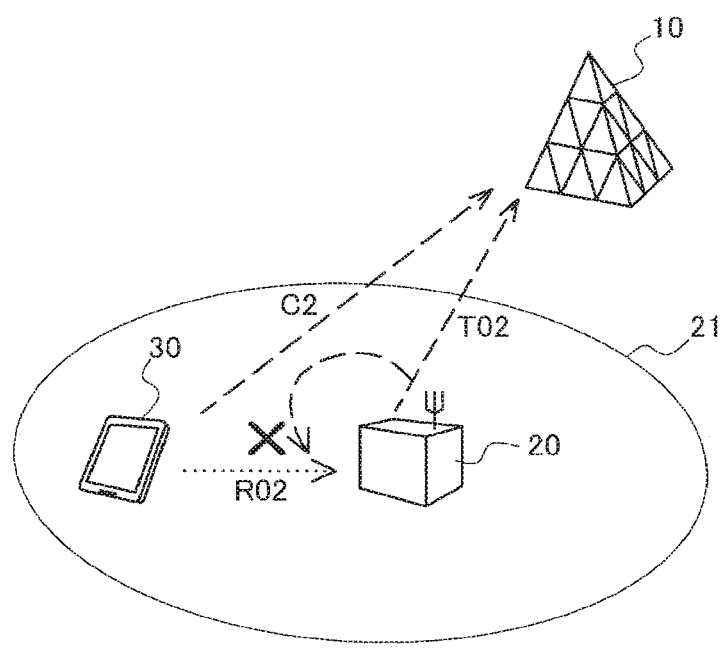
FIG. 2B is an explanatory diagram illustrated to describe the self-interference in the FD mode of an uplink.

In the FD mode, the radio communication apparatus 20 transmits a radio signal in one of the links, and at the same time, receives a radio signal in the other link. The transmission signal radiated from a transmitting antenna of the radio communication apparatus 20 is wrapped around into a receiving antenna of the radio communication apparatus 20, resulting in the occurrence of the so-called self-interference. FIG. 2A illustrates the self-interference in the FD mode of the downlink. In FIG. 2A, a transmission signal T01 transmitted from the radio communication apparatus 20 to a terminal device 30 on the access link 23 interferes with a reception signal R01 received by the radio communication apparatus 20 from the macro-cell base station 10 on the radio backhaul link 22, which is caused by leak. FIG. 2B illustrates the self-interference in the FD mode of the uplink. In FIG. 2B, a transmission signal T02 transmitted to the macro-cell base station 10 from the radio communication apparatus 20 on the radio backhaul link 22 interferes with a reception signal R02 received by the radio communication apparatus 20 from the terminal device 30 on the access link 23, which is caused by leak.

To remove such self-interference, the radio communication apparatus 20 may use, for example, the SIG technique disclosed in Non-Patent Literature 3. However, when the ratio of the power of the transmission signal to the power of the reception signal that is a desired signal is not small, it is likely that the self-interference is failed to be sufficiently removed even using the SIC technique as a result of the considerably large level of the self-interference. Therefore, in the present embodiment, the cooperative control of resources to be used for the radio backhaul link and the access link allows the self-interference to be removed easily and allows the opportunities to use the FD mode to be extended, as described in detail in the next section.

2. Exemplary Configuration of Communication Control Apparatus

FIG. 3 is a block diagram illustrating an example of the logical configuration of the communication control apparatus 10 according to the present embodiment. Referring to FIG. 3, the communication control apparatus 10 is configured to include a radio communication unit 110, a network communication unit 120, a storage unit 130, and a control unit 140.

2-1. Description of Components

(1) Radio Communication Unit

The radio communication unit 110 executes radio communication with a terminal device to be connected to the macro cell 11 (hereinafter, referred to as a macro-cell terminal). For example, the radio communication unit 110 receives the uplink traffic from the macro-cell terminal and transmits the downlink traffic to the macro-cell terminal. In addition, the radio communication unit 110 broadcasts a synchronization signal and a reference signal in the downlink. The synchronization signal is used so that the macro-cell terminal synchronizes with the macro cell 11. The radio communication apparatus 20 can also synchronize with the macro cell 11 by searching the synchronization signal. The reference signal is used to measure the communication quality. The communication quality measured using the reference signal may be, for example, an indicator for the handover determination to trigger a handover between macro cells or between a macro cell and a small cell.

In addition, the radio communication unit 110 establishes the radio backhaul link 22 with the radio communication apparatus 20 that operates the small cell 21 within the macro cell 11. For example, the uplink traffic transmitted from a terminal device to be connected to the small cell 21 (hereinafter, referred to as a small-cell terminal) is relayed through the radio communication apparatus 20 and is received by the radio communication unit 110 on the radio backhaul link 22. Additionally, the radio communication unit 110 transmits the downlink traffic, which is directed to the small-cell terminal as a destination, to the radio communication apparatus 20 on the radio backhaul link 22. This downlink traffic is relayed to the small-cell terminal as the destination through the radio communication apparatus 20. Exchange of a control message between the communication control apparatus 10 and the radio communication apparatus 20 is also performed on the radio backhaul link 22.

(2) Network Communication Unit

The network communication unit 120 is a communication interface that allows the communication control apparatus 10 to be connected to a core network 15. The network communication unit 120 may be a wired communication interface or may be a wireless communication interface. The network communication unit 120 transmits and receives data traffic to and from various control nodes within the core network 15 and exchanges a control message with the nodes.

(3) Storage Unit

The storage unit 130 stores a program and data used to operate the communication control apparatus 10 using a storage medium such as hard disk or semiconductor memory. The data stored by the storage unit 130 may include information on a macro cell (e.g. the position of a macro-cell base station, the radius of a cell, configuration of an antenna, an operating frequency band), information on a master device (e.g. information on ID, type, position, and capability of a device), information on a small cell (e.g. the radius of a cell and the number of small-cell terminals), and various control parameters (e.g. determination threshold value described later). The information on a master device and the information on a small cell are collected by the radio communication apparatus 20.

(4) Control Unit

The control unit 140 controls the overall operation of the communication control apparatus 10. In the present embodiment, the control unit 140 is configured to include a macro-cell control unit 142 and a cooperative control unit 144.

(4-1) Macro-Cell Control Unit

The macro-cell control unit 142 controls the radio communication with the macro-cell terminal by the radio communication unit 110. The macro-cell control unit 142 generates, for example, system information such as an operation frequency band and an antenna configuration of the macro cell 11 and allows the radio communication unit 110 to broadcast the generated system information. In addition, the macro-cell control unit 142 executes the allocation of radio resources to each of the macro-cell terminals and executes a transmission and retransmission control for each of the macro-cell terminals. The macro-cell control unit 142 transfers the uplink traffic, which is inputted from the radio communication unit 110, to the network communication unit 120. Further, the macro-cell control unit 142 transfers the downlink traffic, which is inputted from the network communication unit 120, to the radio communication unit 110.

(4-2) Cooperative Control Unit

The cooperative control unit 144 controls the use of the radio backhaul link and the access link by the radio communication apparatus 20 to facilitate efficient radio communication utilizing one or more small cells 21. For example, the cooperative control unit 144 determines whether the radio communication apparatus 20 is to execute radio communication in the FD mode. If the radio communication is determined to be executed in the FD mode, the cooperative control unit 144 instructs the radio communication apparatus 20 to operate in the FD mode. On the other hand, if the radio communication apparatus 20 is determined not to execute the radio communication in the FD mode, the cooperative control unit 144 instructs the radio communication apparatus 20 to operate in a non-FD mode.

For example, the cooperative control unit 144 determines whether the radio communication apparatus 20 has the capability of the FD mode based on at least one of the remaining battery level, configuration of an antenna, and SIC functionality of the radio communication apparatus 20. For example, when the remaining battery level is not sufficient, the number of antennas is insufficient, or the radio communication apparatus 20 does not have the SIC functionality, the radio communication apparatus 20 can be determined as having no capability of the FD mode. In this case, the radio communication apparatus 20 operates in a non-FD mode.

In addition, for example, the cooperative control unit 144 may determine whether to increase the capacity of the radio communication apparatus 20 based on at least one of the amount of traffic to be processed by the radio communication apparatus 20 and the assumed number of small-cell terminals. If the amount of traffic to be processed exceeds a threshold or if the assumed number of small-cell terminals exceeds a threshold, it is desirable to increase the capacity of the radio communication apparatus 20 by activating the FD mode. Thus, in this case, the cooperative control unit 144 can determine that the radio communication apparatus 20 is to execute the radio communication in the FD mode (i.e., the reception and transmission (transmission and reception) on the radio backhaul link 22 and the access link 23 are to be executed simultaneously on the same channel). At that point, when there is no necessity to increase the capacity of the radio communication apparatus 20, the cooperative control unit 144 can determine that the radio communication apparatus 20 is not necessary to execute the radio communication in the FD mode.

The radio communication apparatus 20, when operating in the FD mode, removes the self-interference due to the leak of the transmission signal from the reception signal by using the SIC technique. The cooperative control unit 144, when instructing the radio communication apparatus 20 to operate in the FD mode, controls the resource to be used for the radio backhaul link 22 and the access link 23 to support a removal of the self-interference in the radio communication apparatus 20, and thus the cooperative control unit 144 adjusts the power ratio between the reception signal and the transmission signal in these links (hereinafter referred to as a control power ratio).

As one example, the control power ratio $R_{CTRL}$ is set to the ratio of the power of the transmission signal to the power of the reception signal in the radio communication apparatus 20 and is expressed as the following expression using decibel representation. In the expression, $P_{TX}$ represents the power of the transmission signal in the radio communication apparatus 20, and $P_{RX}$ represents the power of the reception signal in the radio communication apparatus 20.

[Math. 1]

$$R_{ctrl} = 10 \log_{10} \frac{P_{Tx}}{P_{Rx}} \quad (1)$$

The cooperative control unit 144 adjusts the power of the transmission signal and the reception signal in the radio communication apparatus 20 so that the control power ratio $R_{CTRL}$ does not exceed a predetermined threshold, i.e., so that the following conditional expression (2) is satisfied. In the conditional expression (2), a threshold $R_{th}$ represents the upper limit of the control power ratio $R_{CTRL}$ that can be used to remove the self-interference to the extent that the reception signal can be appropriately demodulated in the radio communication apparatus 20. The threshold $R_{th}$ may be fixedly defined in advance, or may be set dynamically depending on the type or SIC capability of the radio communication apparatus 20.

[Math. 2]

$$R_{ctrl} \leq R_{th} \quad (2)$$

Meanwhile, the cell radius of the macro cell 11 is typically larger than the cell radius of the small cell 21. For this reason, in many cases, the transmission power of the radio signal transmitted on the radio backhaul link 22 is larger than the transmission power of the radio signal transmitted on the access link 23. Thus, rather than the FD mode of the downlink, the FD mode of the uplink is more likely to fail to satisfy the above-mentioned conditional expression (2). Thus, the following description will focus on the FD mode of the uplink. However, the following description will be also applied to the FD mode of the downlink by just replacing the links.

In the uplink, the control power ratio $R_{CTRL}$ is the ratio of the power of the transmission signal to the macro-cell base station 10 via the radio backhaul link 22 to the power of the reception signal from one or more small-cell terminals via the access link 23. When the control power ratio $R_{CTRL}$ predicted as a result of the normal scheduling and transmission power control exceeds the threshold $R_{th}$, the cooperative control unit 144 reduces the power of the transmission signal by lowering the modulation order applied to the transmission signal on the radio backhaul link 22. In addition, the cooperative control unit 144 increases the radio resource allocated to the transmission signal on the radio backhaul link 22 so that the reduction in the throughput of the radio backhaul link 22 due to the lowering of the modulation order is compensated. Such control on the transmission side allows the control power ratio $R_{CTRL}$ to be induced in such a way to satisfy the conditional expression (2).

In addition, when there is no or less radio resource that can be additionally allocated to the radio backhaul link 22, the cooperative control unit 144 increases the power of the reception signal in the radio communication apparatus 20 by raising the transmission power of the radio signal transmitted from the small-cell terminal on the access link 23. The raising of the transmission power from the small-cell terminal may increase the interference to a neighboring system, and thus it is advantageous to raise the transmission power from the small-cell terminal only when the radio resource allocated to the transmission signal on the radio backhaul link 22 is difficult to be increased. When the control power ratio $R_{CTRL}$ predicted after the adjustment on the transmission side still exceeds the threshold $R_{th}$, the cooperative control unit 144 increases the power of the reception signal on the access link 23 in the radio communication apparatus 20 by raising the transmission power of the small-cell terminal within a range that does not cause harmful interference to a neighboring system. As a result, the control power ratio $R_{CTRL}$ is lowered, and thus it is possible to satisfy the conditional expression (2).

When the radio resource allocated to the transmission signal on the radio backhaul link 22 is difficult to be increased and the raising of the transmission power of the small-cell terminal from the point of view of harmful interference to a neighboring system is not allowed, the cooperative control unit 144 may determine that the radio communication is not to be executed in the FD mode by the radio communication apparatus 20.

The cooperative control unit 144 performs signaling of resource allocation information, adaptive modulation and coding (AMC) information, and transmission power information determined by the adjustment of the control power ratio $R_{CTRL}$ to the radio communication apparatus 20 on the radio backhaul link 22.

2-2. Distribution of Resources in FD Mode

In this section, some examples of distributing resources in the case where the FD mode is selected will be described.

(1) First Example

FIG. 4 is an explanatory diagram illustrated to describe a first example of the distribution of radio resources to a backhaul link (BL) and an access link (AL). In the first example, the macro cell 11 is operated in a frequency division duplex (FDD) scheme. In the FDD scheme, the frequency channel for the downlink and the frequency channel for the uplink are different from each other. In the example of FIG. 4, a frequency channel F11 is used for the downlink, and a frequency channel F12 is used for the uplink.

In the subframes T11 and T12, the operation mode of the radio communication apparatus 20 is a non-FD mode. In the downlink, the downlink traffic is received on the radio backhaul link 22 in the subframe T11, and the downlink traffic is transmitted on the access link 23 in the subframe T12. In the uplink, the uplink traffic is received on the access link 22 in the subframe T12, and the uplink traffic is transmitted on the radio backhaul link 23 in the subframe T12.

In the subframes T13 to T16, the operation mode of the radio communication apparatus 20 is the FD mode. In the downlink, in each of the subframes T13 to T16, the downlink traffic is received on the radio backhaul link 22, and at the same time, the downlink traffic is transmitted on the access link 23. In the uplink, in each of the subframes T13 to T16, the uplink traffic is received on the access link 23, and at the same time, the uplink traffic is transmitted on the radio backhaul link 22.

(2) Second Example

FIG. 5 is an explanatory diagram illustrated to describe a second example of the distribution of radio resources to the backhaul link (BL) and the access link (AL). In the second example, the macro cell 11 is operated in a time division duplex (TDD) scheme. In the TDD scheme, the frequency channel for the downlink and the frequency channel for the uplink are same as each other. In the example of FIG. 5, a frequency channel F21 is used for both the downlink and the uplink. The direction of the link (downlink/uplink) may vary for each subframe, for example, in accordance with the link direction configuration (UL-DL configuration) that is dynamically determined by the macro-cell control unit 142.

In the subframes T21 and T22, the operation mode of the radio communication apparatus 20 is the non-FD mode. The subframes T21 and T22 are downlink subframes. In the subframe T21, the downlink traffic is received on the radio backhaul link 22. In the subframe T22, the downlink traffic is transmitted on the access link 23.

In the subframes T23 to T28, the operation mode of the radio communication apparatus 20 is the FD mode. The subframes T23, T24, and T28 are downlink subframes (or special subframes). In each of these subframes, the downlink traffic is received on the radio backhaul link 22, and at the same time, the downlink traffic is transmitted on the access link 23. The subframes T25, T26, and T27 are uplink subframes. In each of these subframes, the uplink traffic is received on the access link 23, and at the same time, the uplink traffic is transmitted on the radio backhaul link 22.

(3) Detailed Allocation of Resources

FIG. 6 is an explanatory diagram illustrated to describe an example of the detailed distribution of radio resources in a subframe in which radio communication is performed in the FD mode. In the example of FIG. 6, in each of the subframes T13 to T16, the radio communication is performed on the FD mode of the uplink. The lower portion of FIG. 6 shows a set of time-frequency resources of the frequency channel F12 in the subframe T13 in a grid pattern. Herein, the allocation unit of radio resources will be also referred to as a resource block, using the terminology of LTE scheme. In the example of FIG. 6, a total of 16 resources blocks are allocated to the access link 23 (12 resource blocks for a small-cell terminal UE1 and 4 resource blocks for a small-cell terminal UE2). In addition, 24 resource blocks are allocated to the radio backhaul link 22. A relatively high order modulation scheme (e.g. 64QAM, 16QAM, or QPSK) may be used for the resource block of the access link 23, and meanwhile, a relatively low order modulation scheme (e.g. 16QAM, QPSK, or BPSK) may be used for the resource block of the radio backhaul link 22. This allows the control power ratio $R_{CTRL}$ to be prevented from failing to satisfy the conditional expression (2) by suppressing the control power ratio $R_{CTRL}$ while maintaining the balance of the overall throughput. The time-frequency resource allocated to the radio backhaul link 22 and the time-frequency resource allocated to the access link 23 may overlap each other. In the example of FIG. 6, 4 resource blocks are allocated to both the radio backhaul link 22 and the access link 23.

In this figure, a resource block that is not allocated to the radio backhaul link 22 and the access link 23 may be used for the communication for the macro-cell terminal, control signaling, or the communication in another small cell.

2-3. Non-FD Mode

When the radio communication apparatus 20 is operated in the non-FD mode, the reception and transmission of the radio signal in the radio communication apparatus 20 are not performed simultaneously on the same channel, and thus the self-interference does not occur. However, for example referring to FIG. 2A, in the small-cell terminal 30, the downlink signal R01 from the macro-cell base station 10 may give interference to the downlink signal T01 from the radio communication apparatus 20. In addition, referring to FIG. 2B, in the macro-cell base station 10, the uplink signal R02 from the small-cell terminal 30 may give interference to the uplink signal T02 from the radio communication apparatus 20. Given the difference described above between the cell radii of the macro cell 11 and the small cell 21, of these two cases, particularly the interference in the small-cell terminal 30 on the downlink is likely to reach a nonnegligible level.

Thus, when the cooperative control unit 144 operates the radio communication apparatus 20 in the non-FD mode (e.g. when the amount of traffic to be processed by the radio communication apparatus 20 is not large), the cooperative control unit 144 may cause the radio communication apparatus 20 to execute the interference avoidance in the time division scheme. In this case, different time resources are allocated to the radio backhaul link 22 and the access link 23.

Figure 7:
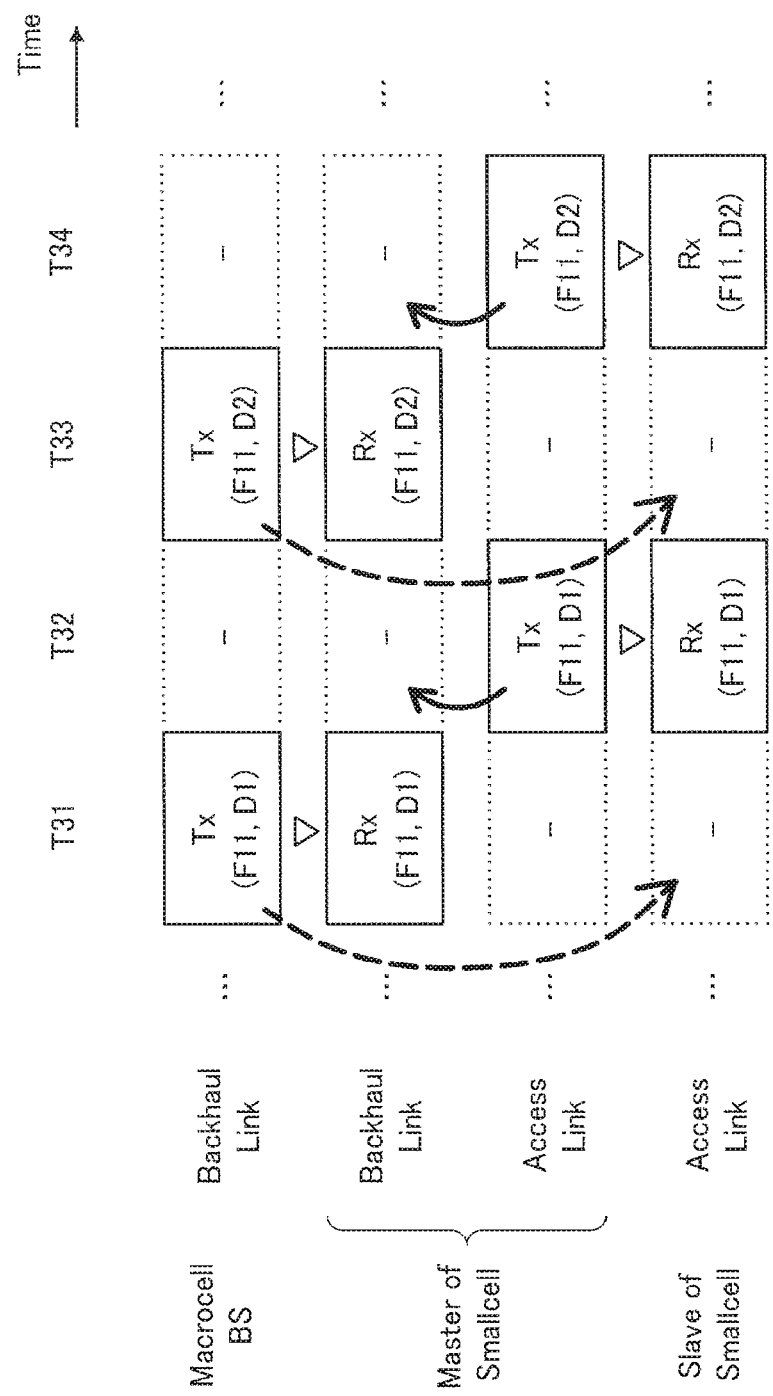
FIG. 7 is an explanatory diagram illustrated to describe a first example of the interference control of the downlink in the non-FD mode.

FIG. 7 is an explanatory diagram illustrated to describe a first example of the interference control of the downlink in the non-FD mode. Referring to FIG. 7, four subframes T31 to T34 are shown along the time direction. The subframe T31 is allocated to the radio backhaul link 22, and for example, the macro-cell base station 10 transmits downlink data D1 in the subframe T31 to the radio communication apparatus 20 on the frequency channel F11. Although the downlink signal from the macro-cell base station 10 can reach the small-cell terminal, the small-cell terminal does not cause any interference (dotted arrow) because the communication is not performed in the access link 23. The subframe T32 is allocated to the access link 23, and for example, the radio communication apparatus 20 transmits the downlink data D1 in the subframe T32 to the small-cell terminal on the frequency channel F11. Although the downlink signal from the radio communication apparatus 20 is wrapped around into a reception circuit of the radio communication apparatus 20, the radio communication apparatus 20 does not cause any self-interference (solid arrow) because the communication is not performed in the radio backhaul link 22. The subframe T33 is allocated to the radio backhaul link 22, and for example, the macro-cell base station 10 transmits downlink data D2 in the subframe T33 to the radio communication apparatus 20 on the frequency channel F11. Although the downlink signal from the macro-cell base station 10 is wrapped around into the small-cell terminal, the small-cell terminal does not cause any interference (dotted arrow) because the communication is not performed in the access link 23. The subframe T34 is allocated to the access link 23, and for example, the radio communication apparatus 20 transmits the downlink data D2 in the subframe T34 to the small-cell terminal on the frequency channel F11. Although the downlink signal from the radio communication apparatus 20 is wrapped around into the reception circuit of the radio communication apparatus 20, the radio communication apparatus 20 does not cause any self-interference (solid arrow) because the communication is not performed in the radio backhaul link 22.

When the cooperative control unit 144 operates the radio communication apparatus 20 in the non-FD mode, the cooperative control unit 144 may cause the radio communication apparatus 20 to execute the interference avoidance in the frequency division scheme rather than the time division scheme. In this case, different frequency channels are allocated to the radio backhaul link 22 and the access link 23.

Figure 8:
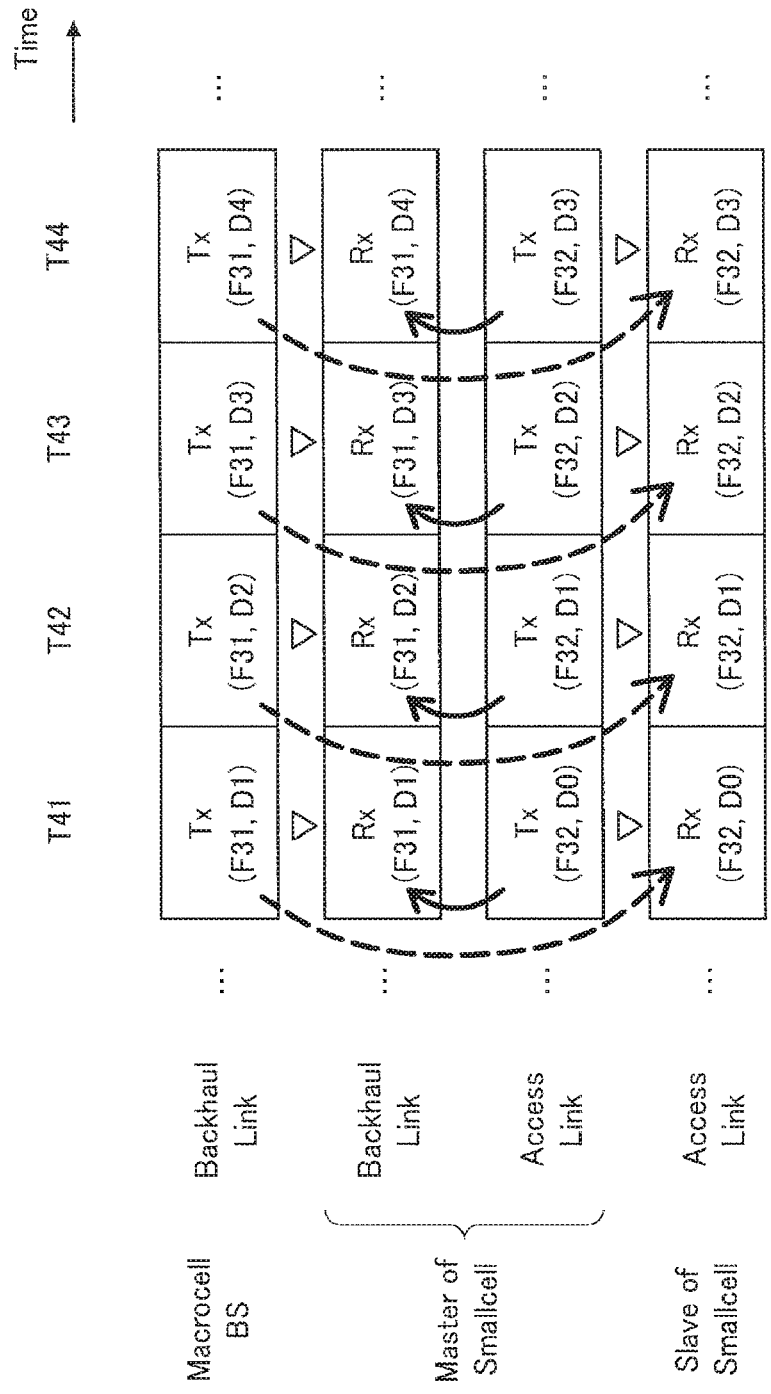
FIG. 8 is an explanatory diagram illustrated to describe a second example of the interference control of the downlink in the non-FD mode.

FIG. 8 is an explanatory diagram illustrated to describe a second example of the interference control of the downlink in the non-FD mode. Referring to FIG. 8, four subframes T41 to T44 are shown along the time direction. A frequency channel F31 is allocated to the radio backhaul link 22. A frequency channel F32 is allocated to the access link 23. For example, the macro-cell base station 10 transmits the downlink data D1 in the subframe T41 to the radio communication apparatus 20 on the frequency channel F31. The radio communication apparatus 20 transmits downlink data D0 in the subframe T41 to the small-cell terminal on the frequency channel F32. Although the downlink signal from the macro-cell base station 10 can reach the small-cell terminal, the isolation using a filter provided in a radio circuit allows the occurrence of harmful interference to be prevented (dotted arrow) because there is sufficient frequency spacing between the frequency channel F31 and the frequency channel F32. In addition, although the downlink signal from the radio communication apparatus 20 is wrapped around into the reception circuit of the radio communication apparatus 20, the occurrence of harmful self-interference can be prevented (solid arrow) because there is sufficient frequency spacing between the frequency channel F31 and the frequency channel F32. Similarly, in the subsequent subframes T42, T43, and T44, the radio communication can be executed in both the radio backhaul link 22 and the access link 23 while avoiding interference using the frequency division scheme.

Figure 9A:
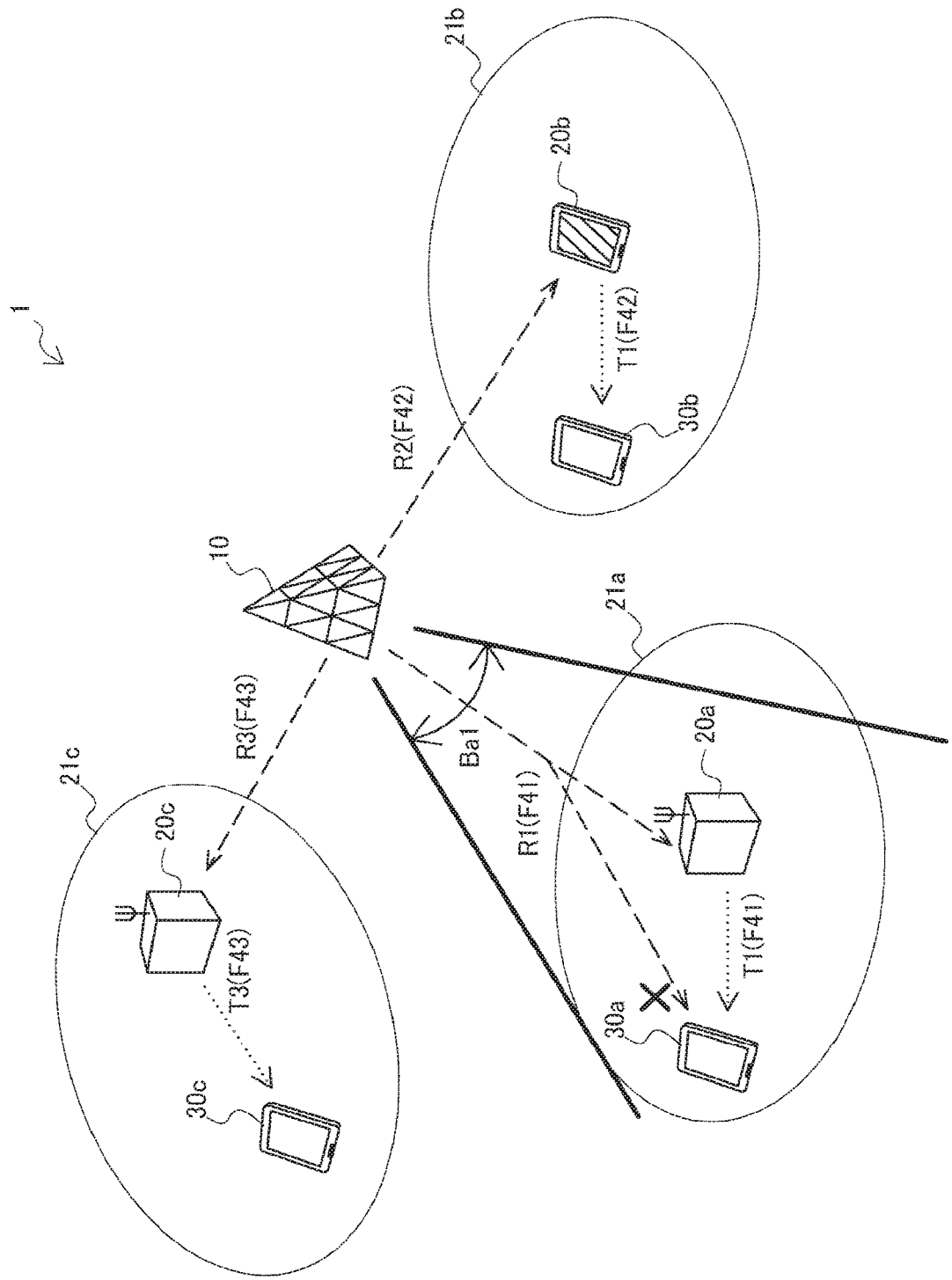
FIG. 9A is a first explanatory diagram illustrated to describe a third example of the interference control of the downlink in the non-FD mode.

When the same frequency channel is allocated to the radio backhaul link 22 and the access link 23, the interference avoidance using the space division (beam forming) scheme is not easy. This is because there is no large difference in angle between the direction toward a master device of a small cell and the direction toward a slave device (small-cell terminal) of the small cell, when viewed from the macro-cell base station. As shown in FIG. 9A, for example, the downlink signal R1 transmitted to the radio communication apparatus 20a on the radio backhaul link 22 in the frequency channel F41 reaches the small-cell terminal 30a even when the directivity of the beam width Ba1 is given to the downlink signal R1 by beam forming, which can cause interference.

Figure 9B:
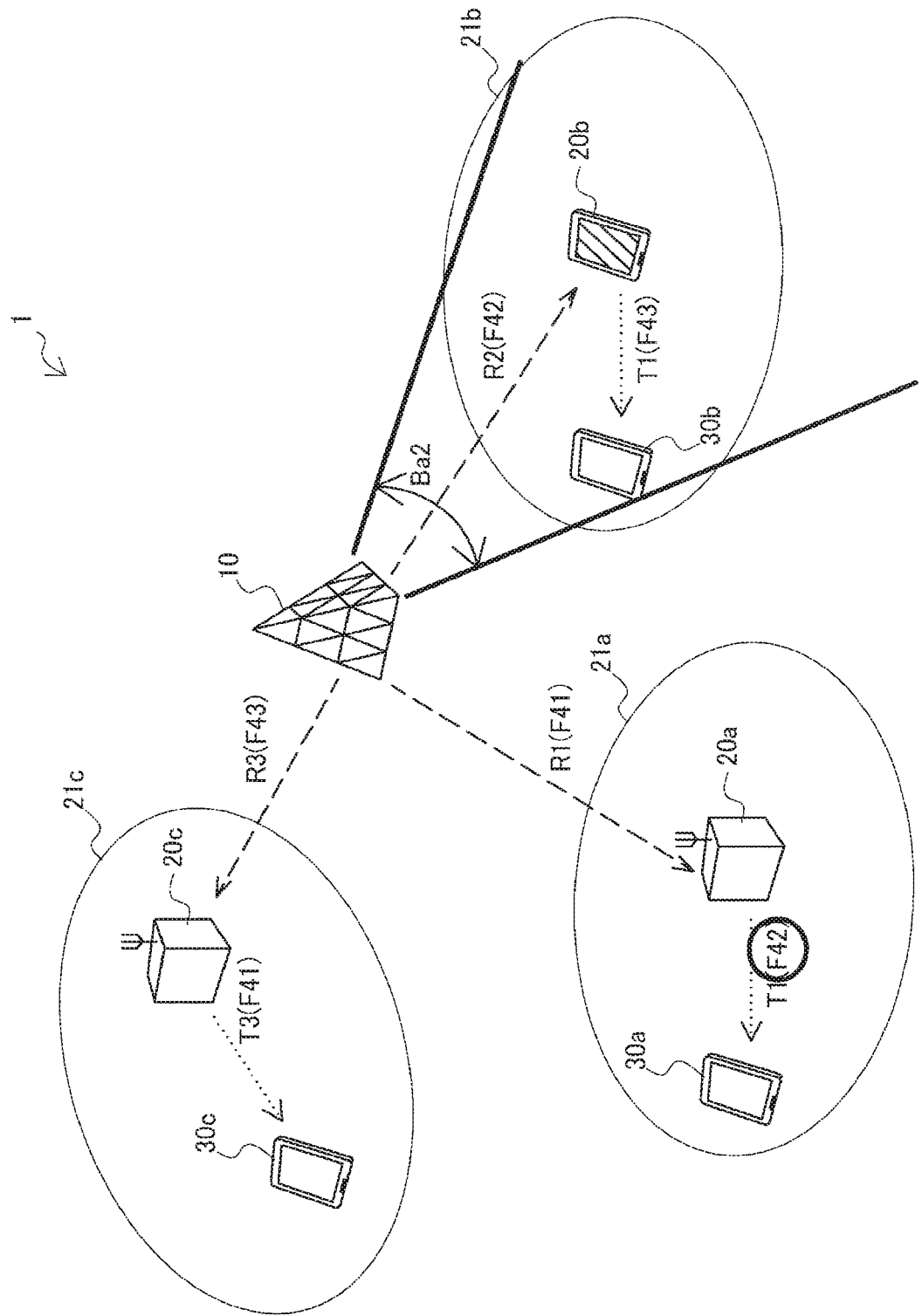
FIG. 9B is a second explanatory diagram illustrated to describe the third example of the interference control of the downlink in the non-FD mode.

On the other hand, when different frequency channels are allocated to the radio backhaul link 22 and the access link 23, it is possible to avoid interference in a more efficient manner by further combining it with the beam forming technique. In the example shown in FIG. 9B, the frequency channel F41 for the radio backhaul link and the frequency channel F42 for the access link are allocated to the small cell 21a operated by the radio communication apparatus 20a. The frequency channel F42 for the radio backhaul link and the frequency channel F43 for the access link are allocated to the small cell 21b operated by the radio communication apparatus 20b. The frequency channel F43 for the radio backhaul link and the frequency channel F41 for the access link are allocated to the small cell 21c operated by the radio communication apparatus 20c. In other words, even in any small cell, the operation is performed in the frequency division scheme described above. Furthermore, the combination of the frequency resource allocated to the radio backhaul link and the frequency resource allocated to the access link is different for each master device connected to the same macro-cell base station 10. The radio backhaul link is implemented using the beam forming technique. For example, the small-cell terminal 30a receives the downlink signal T1 from the radio communication apparatus 20a in the frequency channel F42. In the communication control system 1, the link that shares the frequency channel F42 is the radio backhaul link of the radio communication apparatus 20b. However, when the directivity of the beam width Ba2 is given to the downlink signal R2 transmitted on the radio backhaul link of the radio communication apparatus 20b using the beam forming, the downlink signal R2 does not reach the small-cell terminal 30a. Thus, any harmful interference does not occur in the small-cell terminal 30a.

In this way, when a large number of small cells are operated in a macro cell, by combining the allocation of different frequency resources to the radio backhaul link and the access link and the beam forming technique, a desired signal on one of the links can avoid receiving the interference from the radio signal on the other link while use of frequency resources efficiently. The following Table 1 and Table 2 show an example of resource allocation to n small cells when n pieces of frequency resources are available. In the example of Table 1, n may be any integer. In the example of Table 2, n is set to an even number. Here, the frequency resource may correspond to the frequency channel, or may be a resource that is segmented in smaller units in the frequency direction.

TABLE 1

Example of allocation of frequency resources to
a plurality of small cells (cyclical slide)

| Type of link | Small cell $C_1$ | Small cell $C_2$ | ... | Small cell $C_{n-1}$ | Small cell $C_n$ |
|---|---|---|---|---|---|
| Backhaul link | $F_1$ | $F_2$ | ... | $F_{n-1}$ | $F_n$ |
| Access link | $F_2$ | $F_3$ | ... | $F_n$ | $F_1$ |

TABLE 2

Example of allocation of frequency resources to a
plurality of small cells (swapping for each pair)

| Type of link | Small cell $C_1$ | Small cell $C_2$ | ... | Small cell $C_{n-1}$ | Small cell $C_n$ |
|---|---|---|---|---|---|
| Backhaul link | $F_1$ | $F_2$ | ... | $F_{n-1}$ | $F_n$ |
| Access link | $F_2$ | $F_1$ | ... | $F_n$ | $F_{n-1}$ |

In these examples of frequency resource allocation, the mapping of each small cell and each frequency resource may be determined, for example, by executing a search process for maximizing some evaluation functions (sum or minimum value of distances between base stations using the same frequency resource, etc.). This allows the risk of interference in the system to be reduced as a whole, thereby optimizing the system capacity.

Even when the radio communication apparatus 20 operates in the FD mode, in the small-cell terminal 30, the downlink signal from the macro-cell base station 10 may interfere with the downlink signal from the radio communication apparatus 20. In addition, in the macro-cell base station 10, the uplink signal from the small-cell terminal 30 may interfere with the uplink signal from the radio communication apparatus 20. When such interference is likely to reach an harmful level, the interference control method described in this section may be combined with the FD mode. For example, without performing overlapping allocation of time-frequency resources to the radio backhaul link and the access link as illustrated in FIG. 6, it is possible to reduce the level of interference experienced by the small-cell terminal in the FD mode of the downlink by further combining the beam forming technique described with reference to FIG. 9B.

3. Exemplary Configuration of Radio Communication Apparatus

Figure 10:
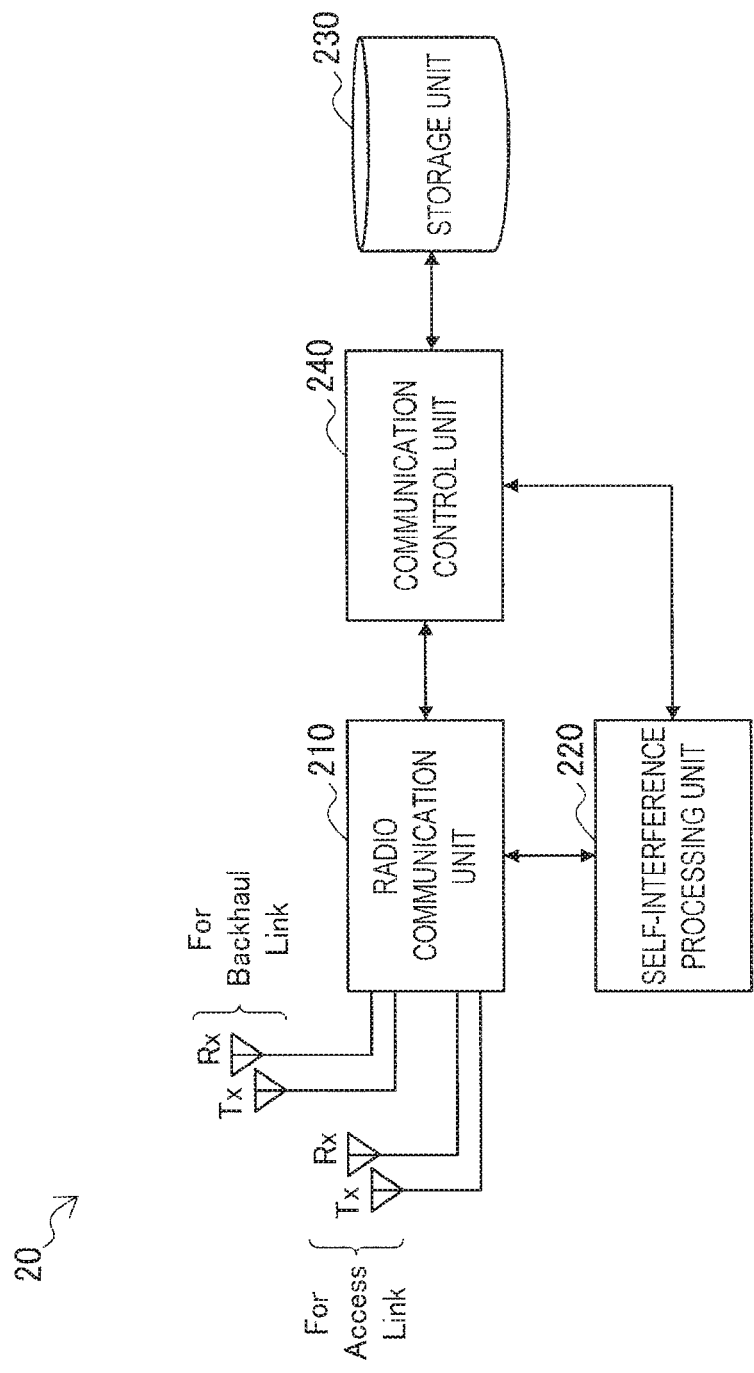
FIG. 10 is a block diagram illustrating an example of the logical configuration of a radio communication apparatus according to one embodiment.

FIG. 10 is a block diagram illustrating an example of the logical configuration of the radio communication apparatus 20 according to the present embodiment. Referring to FIG. 10, the radio communication apparatus 20 is configured to include a radio communication unit 210, a self-interference processing unit 220, a storage unit 230, and a communication control unit 240.

3-1. Description of Components (1) Radio Communication Unit

The radio communication unit 210 establishes the access link 23 with one or more small-cell terminals (slave devices) in the small cell 21, and communicates with the small-cell terminal on the access link 23. In addition, the radio communication unit 210 establishes the radio backhaul link 22 with the macro-cell base station 10, and communicates with the macro-cell base station 10 on the radio backhaul link 22. As shown in FIG. 10, the radio communication unit 210 has at least four antennas, two of which are used for the access link 23, and the other two are used for the radio backhaul link 22. One of two antennas for the access link 23 is intended for downlink transmission, and the other one is intended for uplink reception. One of two antennas for the radio backhaul link 22 is intended for downlink reception, and the other one is intended for uplink transmission.

In the present embodiment, the radio communication unit 210 operates in any one mode of full duplex (FD) mode and non-FD mode as described above. When the FD mode is set by the communication control unit 240 described later, the radio communication unit 210 receives the downlink signal through the receiving antenna for the radio backhaul link 22, and at the same time, transmits the downlink signal through the transmitting antenna for the access link 23 on the same channel. Similarly, the radio communication unit 210 receives the uplink signal through the receiving antenna for the access link 23, and at the same time, transmits the uplink signal through the transmitting antenna for the radio backhaul link 22 on the same channel. When the non-FD mode is set by the communication control unit 240 described later, the radio communication unit 210 uses different resources in one or both of time and frequency for the transmission and reception (reception and transmission) in the radio backhaul link 22 and the access link 23.

The configuration of the antenna described herein is merely an example. Some antennas may be shared, or more antennas than shown may be used. For example, the radio communication unit 210 may have two antennas, one is intended for the access link 23 shared by the downlink transmission and the uplink reception, and the other is intended for the radio backhaul link 22 shared by the downlink reception and the uplink transmission.

(2) Self-interference Processing Unit

When the radio communication in the FD mode is executed in the radio communication unit 210, the self-interference processing unit 220 removes the self-interference due to the leak of the transmission signal from the reception signal. The self-interference processing unit 220 may subtract the product of a channel response of the leak channel and a replica of the transmission signal from the reception signal and may acquire a desired reception signal obtained by removing the self-interference. The self-interference processing unit 220 may remove the self-interference using any known SIC technique, where the details of the processing will not be described. The self-interference processing unit 220 may apply the SIC technique to one of two systems of downlink and uplink, or may apply the SIC technique to the both.

(3) Storage Unit

The storage unit 230 stores a program and data used to operate the radio communication apparatus 20 using a storage medium such as hard disk or semiconductor memory. The data stored by the storage unit 230 may contain, for example, master device information of the radio communication apparatus 20 and small cell information of the small cell 21 operated by the radio communication apparatus 20. In addition, the data stored by the storage unit 230 may contain various control information that is signaled from the communication control apparatus 10 (e.g. operation mode information, resource allocation information, AMC information, and transmission power information).

(4) Communication Control Unit

The communication control unit 240 controls the radio communication executed by the radio communication unit 210. In addition, the communication control unit 240 also controls the radio communication executed by one or more small-cell terminals connected to the small cell 21. When the operation in the FD mode is instructed from the communication control apparatus 10, the communication control unit 240 sets the operation mode of the radio communication unit 210 to the FD mode. In addition, when the operation in the non-FD mode is instructed from the communication control apparatus 10, the communication control unit 240 sets the operation mode of the radio communication unit 210 to the non-FD mode.

When the radio communication unit 210 operates in the FD mode, the communication control unit 240 causes the radio communication unit 210 to receive the downlink signal on the radio backhaul link 22 from the macro-cell base station 10 in accordance with the resource allocation information received from the communication control apparatus 10, and at the same time, to transmit the downlink signal on the access link 23 of the same channel to the small-cell terminal. Similarly, the communication control unit 240 causes the radio communication unit 210 to receive the uplink signal on the access link 23 from the small-cell terminal in accordance with the resource allocation information received from the communication control apparatus 10, and at the same time, to transmit the uplink signal on the radio backhaul link 22 of the same channel to the macro-cell base station 10.

In at least one of downlink and uplink, a modulation and coding scheme to be applied to the reception and transmission in the radio communication unit 210 can be determined by using the AMC information received from the communication control apparatus 10. In addition, the power of the transmission signal from the radio communication unit 210 and the power of the transmission signal from the small-cell terminal can be determined by using the transmission power information received from the communication control apparatus 10. Consequently, the control power ratio $R_{CTRL}$ that is the power ratio between the reception signal and the transmission signal in the radio communication unit 210 in the FD mode is adjusted so as not to exceed the threshold $R_{th}$ described above. The adjustment of the control power ratio $R_{CTRL}$ so as not to exceed the threshold $R_{th}$ allows the ratio of the power of the self-interference signal to the power of a desired signal to be suppressed. This allows the self-interference processing unit 220 to easily remove the self-interference using the SIC technique.

When the radio communication unit 210 operates in the non-FD mode, the communication control unit 240 causes the radio communication unit 210 to execute radio communication while avoiding interference between nodes in accordance with the resource allocation information received from the communication control apparatus 10. In the non-FD mode, the communication control unit 240 may execute the resource allocation and the transmission power control for the small-cell terminal.

3-2. Operation as Slave Device

The radio communication apparatus 20 can also operate as a slave device (i.e., small-cell terminal) rather than a master device for operating the small cell 21. When the radio communication apparatus 20 operates as a slave device, it is possible not to use two antennas for the radio backhaul link 22 of four antennas of the radio communication unit 210. One of two antennas for the access link 23 can be used to receive the downlink signal, and the other one can be used to transmit the uplink signal. The communication control unit 240 causes the radio communication unit 210 to receive the downlink signal and to transmit the uplink signal in accordance with the resource allocation information received from the master device. The transmission power of the uplink signal is indicated by the transmission power information received from the master device.

4. Procedure of Process

4-1. Communication Control Process

Figure 11:
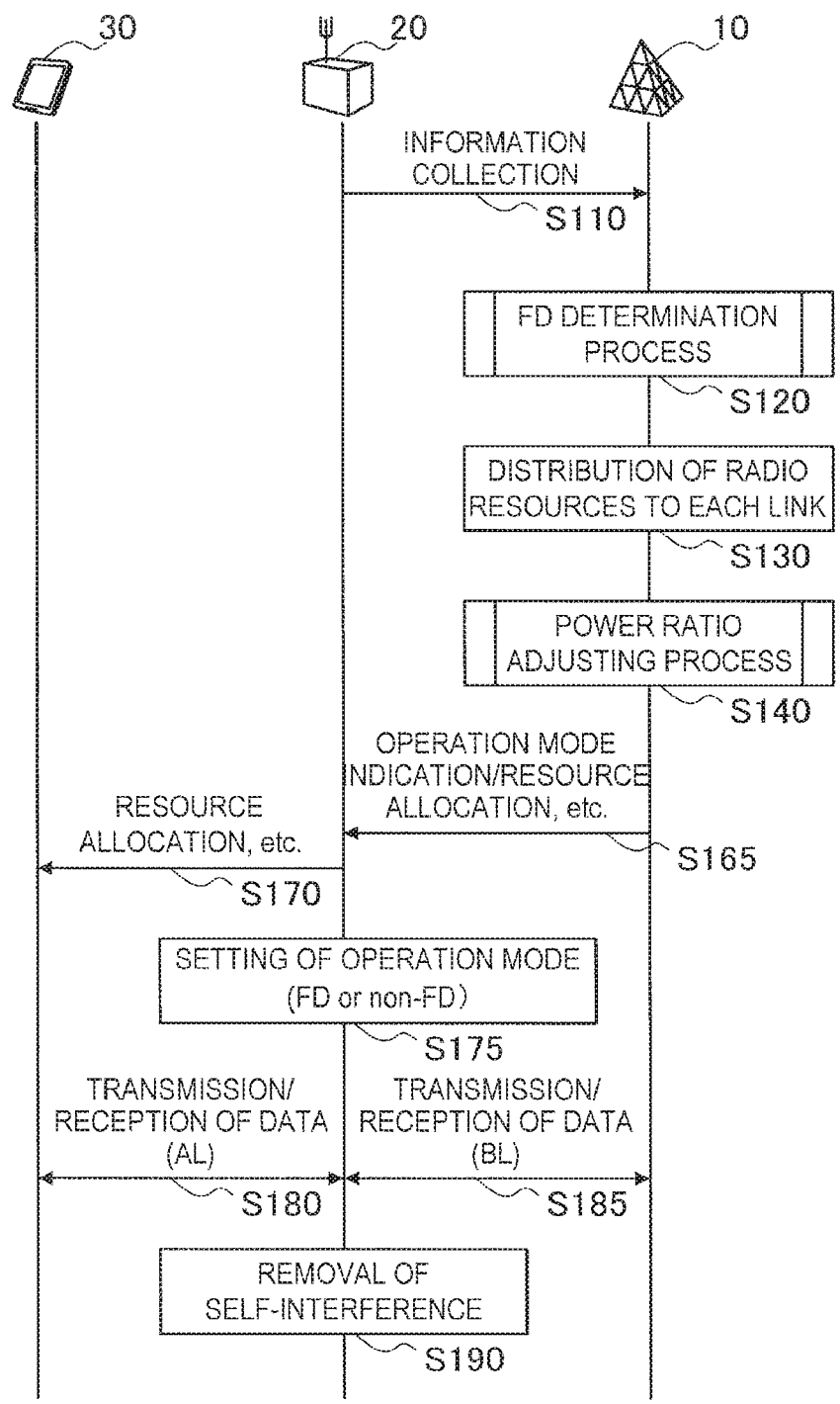
FIG. 11 is a sequence diagram illustrating an exemplary procedure of a communication control process that is executed in the communication control system according to one embodiment.

FIG. 11 is a sequence diagram illustrating an exemplary procedure of a communication control process executed in the communication control system 1 according to one embodiment. In the sequence shown in FIG. 11, the communication control apparatus 10 serving as a macro-cell base station, the radio communication apparatus 20 serving as a master device of a small cell, and the small-cell terminal 30 are involved.

First, the communication control apparatus 10 collects the master device information and the small cell information from the radio communication apparatus 20 (step S110). The collection of such information may be performed periodically, or may be performed through a trigger by an event such as the start of operation of the small cell or the movement of the radio communication apparatus 20.

Then, the communication control apparatus 10 determines whether the radio communication apparatus 20 is to operate in the FD mode by executing the FD determination process (step S120). The FD determination process to be executed here will be described in more detail later.

Then, the communication control apparatus 10 distributes radio resources to the radio backhaul link and access link of the downlink and the radio backhaul link and access link of the uplink based on a result obtained by the FD determination process (step S130). When the FD mode is selected in the FD determination process, the distribution of resources, for example as described with reference to FIG. 4 or 5, may be performed. When the non-FD mode is selected in the FD determination process, the distribution of resources, for example as described with reference to FIG. 7 or 8, may be performed.

When the FD mode is selected, the communication control apparatus 10 adjusts the ratio of the power of the transmission signal to the power of the reception signal in the radio communication apparatus 20 by further executing a power ratio adjusting process (step S140). The power ratio adjusting process to be executed here will be described in more detail later.

Then, the communication control apparatus 10 indicates the operation mode to the radio communication apparatus 20, and transmits resource allocation information and other control information (AMC information and transmission power information in the FD mode) (step S165). The radio communication apparatus 20 transmits the resource allocation information for the small-cell terminal 30 and other control information to the small-cell terminal 30 (step S170).

Then, the radio communication apparatus 20 sets the operation mode of its own device to the mode indicated from the communication control apparatus 10 (step S175). For example, when the FD mode is indicated from the communication control apparatus 10, the transmission/reception of a signal between the small-cell terminal 30 and the radio communication apparatus 20 on the access link is executed simultaneously on the same frequency channel as the reception/transmission of a signal between the radio communication apparatus 20 and the macro-cell base station 10 on the radio backhaul link (steps S180 and S185). Then, the radio communication apparatus 20 removes the self-interference due to the leak of the transmission signal using the SIC technique from the reception signal (step S190).

4-2. FD Determination Process

Figure 12:
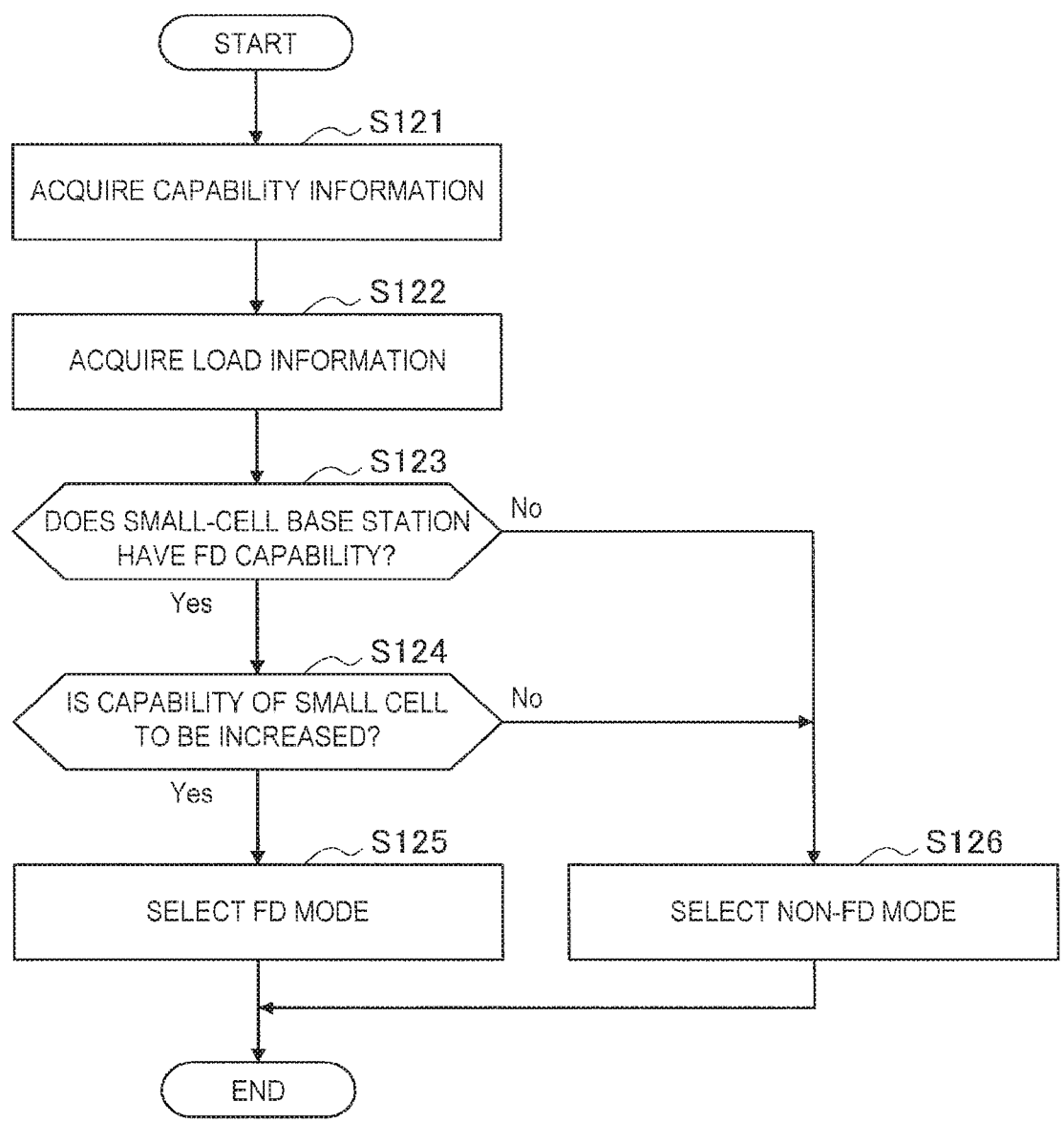
FIG. 12 is a flowchart illustrating an example of the detailed procedure of an FD determination process shown in FIG. 11.

FIG. 12 is a flowchart illustrating an example of the detailed procedure of the FD determination process shown in FIG. 11.

Referring to FIG. 12, first, the cooperative control unit 144 of the communication control apparatus 10 acquires capability information of the radio communication apparatus 20 (step S121). The capability information to be acquired here may include at least one of the remaining battery level, antenna configuration, and SIC functionality of the radio communication apparatus 20. In addition, the cooperative control unit 144 acquires load information that includes at least one of the amount of traffic to be processed by the radio communication apparatus 20 and the number of small-cell terminals (step S122).

Then, the cooperative control unit 144 determines whether the radio communication apparatus 20 has capability of the FD mode based on the acquired capability information (step S123). For example, when the remaining battery level is not sufficient, the number of antennas is insufficient, or the radio communication apparatus 20 does not have the SIC functionality, it is determined that the radio communication apparatus 20 does not have capability of the FD mode, and then the process proceeds to step S126.

When the radio communication apparatus 20 has the capability of the FD mode, the cooperative control unit 144 further determines whether to increase the capacity of the small cell based on the acquired load information (step S124). For example, when the amount of traffic to be processed exceeds a threshold or when the number of small-cell terminals exceeds a threshold, the capacity of the small cell is determined to be increased, and then the process proceeds to step S125. On the other hand, if the capacity of the small cell to be determined not to be increased, the process proceeds to step S126.

In step S125, the cooperative control unit 144 selects the FD mode as the operation mode of the radio communication apparatus 20. On the other hand, in step S126, the cooperative control unit 144 selects the non-FD mode as the operation mode of the radio communication apparatus 20.

4-3. Power Ratio Adjusting Process

Figure 13:
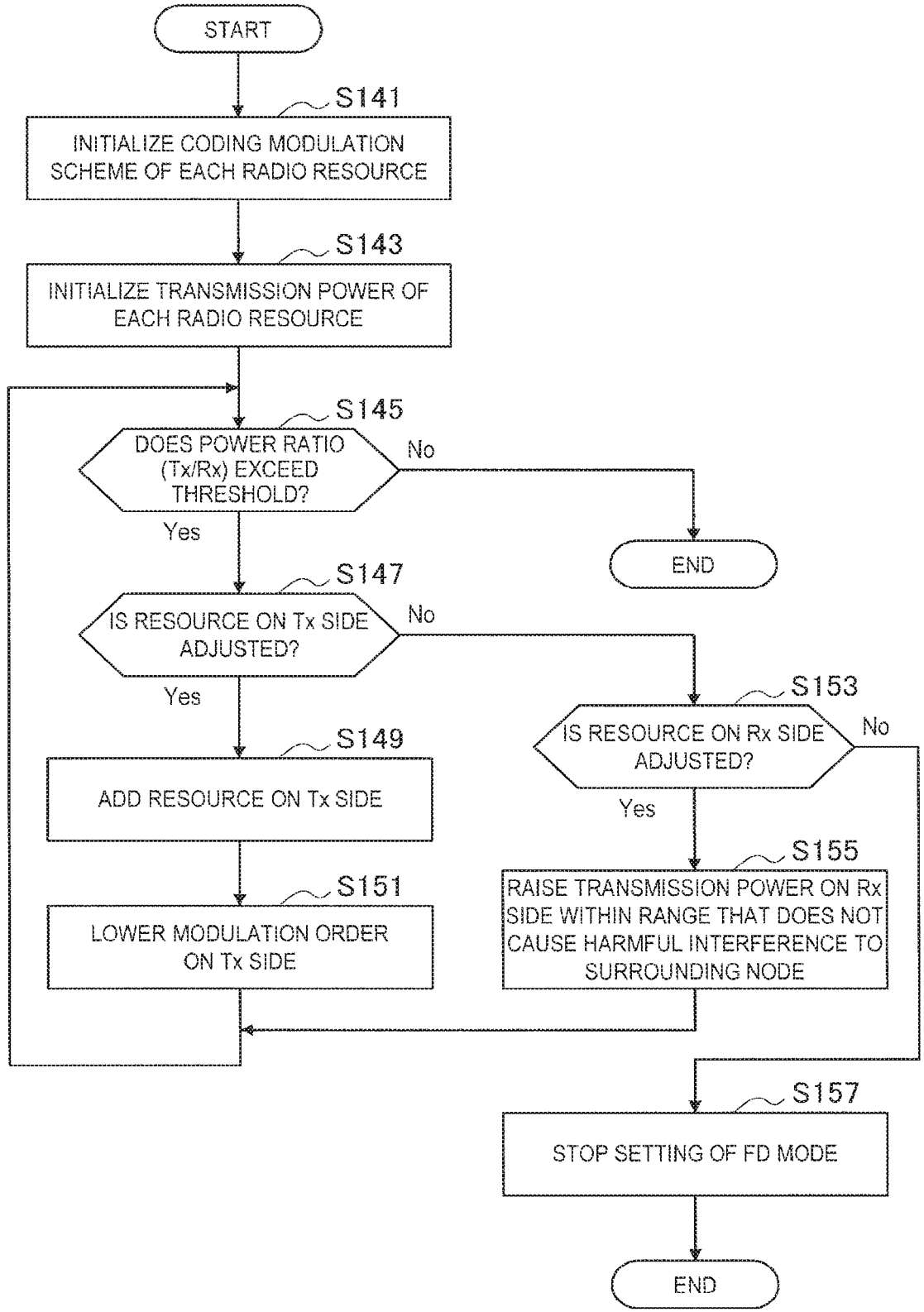
FIG. 13 is a flowchart illustrating an example of the detailed procedure of a power ratio adjusting process shown in FIG. 11.

FIG. 13 is a flowchart illustrating an example of the detailed procedure of the power ratio adjusting process shown in FIG. 11.

Referring to FIG. 13, first, the cooperative control unit 144 determines an initial value of coding modulation scheme for each radio resource based on the initial resource distribution and the channel quality indicator (CQI) received from the radio communication apparatus 20 and the small-cell terminal 30 (step S141). In addition, the cooperative control unit 144 calculates the initial value of the transmission power to be used for each radio resource (step S143).

Then, the cooperative control unit 144 determines whether the control power ratio $R_{CTRL}$ illustrated in Expression (1) exceeds the threshold $R_{th}$ (step S145). If the control power ratio $R_{CTRL}$ exceeds the threshold $R_{th}$, the process proceeds to step S147. If the control power ratio $R_{CTRL}$ does not exceed the threshold $R_{th}$, the coding modulation scheme and the transmission power are determined to be a value at that point of time, and the power ratio adjusting process is terminated.

In step S147, the cooperative control unit 144 determines whether there is room to adjust resources (resources of the access link in the downlink and the radio backhaul link in the uplink) on the transmission side (step S147).

If there is room to adjust resources on the transmission side, the cooperative control unit 144 additionally allocates radio resources to the link on the transmission side (step S149), and further lowers the modulation order of the link on the transmission side (step S151). Then, the process returns to step S145.

If there is no room to adjust resources on the transmission side, the cooperative control unit 144 determines whether there is room to adjust resources (resources of the radio backhaul link in the downlink and the access link in the uplink) on the reception side (step S153). If there is room to adjust resources on the reception side, the cooperative control unit 144 raises the transmission power on the reception side within a range that does not cause harmful interference to surrounding nodes (step S155). Then, the process returns to step S145.

If there is no room to adjust resources for both of the transmission side and the reception side, the setting of FD mode is stopped because the cooperative control unit 144 is not possible to remove the self-interference sufficiently using the SIC technique in the radio communication apparatus 20 (step S157). In this case, the cooperative control unit 144 selects the non-FD mode as the operation mode of the radio communication apparatus 20.

4-4. Modified Example

Figure 14:
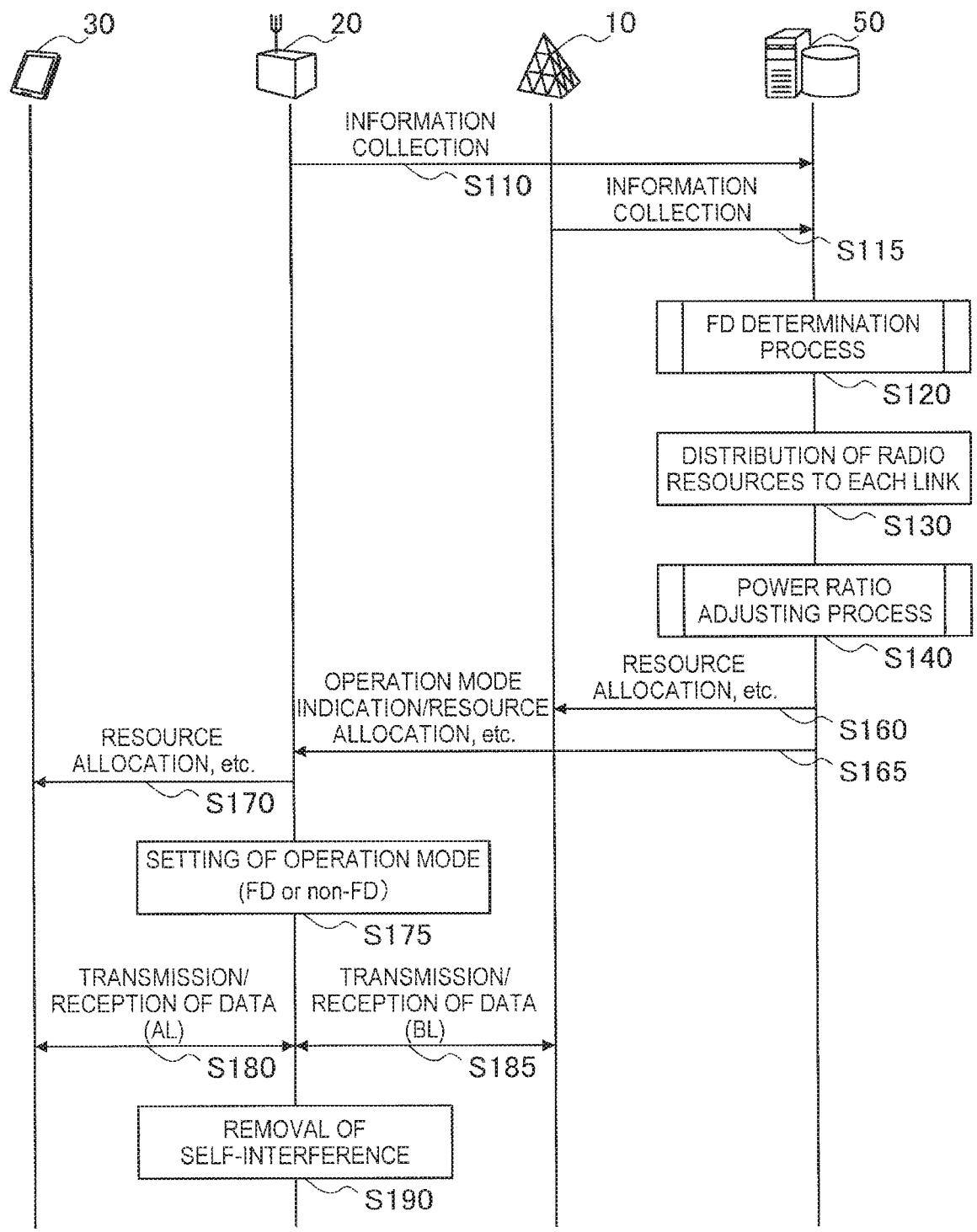
FIG. 14 is a sequence diagram illustrating an exemplary procedure of the communication control process that is executed in one modified example.

As one modified example, the functions of the cooperative control unit 144 of the communication control apparatus 10 as described above may be implemented in the control node within the core network 15 or the PDN 16. FIG. 14 illustrates an example of the procedure of the communication control process executed in such modified example. In the sequence shown in FIG. 14, the macro-cell base station 10, the radio communication apparatus 20, the small-cell terminal 30, and the control node 50 are involved.

First, the control node 50 collects the master device information and the small cell information from the radio communication apparatus 20 (step S110). In addition, the control node 50 collects the macro cell information from the macro-cell base station 10 (step S115). The collection of such information may be performed periodically, or may be performed through a trigger by some events.

Then, the control node 50 determines whether the radio communication apparatus 20 is to operate in the FD mode by executing the FD determination process described with reference to FIG. 12 (step S120).

Then, the control node 50 distributes radio resources to the radio backhaul link and access link of the downlink and the radio backhaul link and access link of the uplink based on a result obtained by the FD determination process (step S130).

When the FD mode is selected, the control node 50 adjusts the ratio of the power of the transmission signal to the power of the reception signal in the radio communication apparatus 20 by further executing the power ratio adjusting process described with reference to FIG. 13 (step S140).

Then, the control node 50 transmits the resource allocation information for a macro cell and other control information to the macro-cell base station 10 (step S160). In addition, the control node 50 indicates the operation mode to the radio communication apparatus 20, and transmits the resource allocation information and other control information (step S165). The radio communication apparatus 20 transmits the resource allocation information for the small-cell terminal 30 and other control information to the small-cell terminal 30 (step S170).

The subsequent processes may be similar to those in the sequence described with reference to FIG. 11.

5. Application Examples

The technology of the present disclosure is applicable to various products. For example, a cooperative control function of a communication control apparatus 10 may be realized as a cooperative control node that corresponds to any type of server such as a tower server, a rack server, and a blade server. The cooperative control function may be a control module (such as an integrated circuit module including a single die, and a card or a blade that is inserted into a slot of a blade server) mounted on the cooperative control node.

For example, the communication control apparatus 10 may be realized as any type of evolved Node B (eNB) such as a macro eNB, a pico eNB, and a home eNB. Instead, the communication control apparatus 10 may be realized as any other types of base stations such as a NodeB and a base transceiver station (BTS).

The radio communication apparatus 20 may also be configured as eNB, or may be configured as other types of base stations such as NodeB or BTS. For example, the radio communication apparatus 20 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The radio communication apparatus 20 may also be realized as a terminal (that is also referred to as a machine type communication (MTC) terminal) that performs machine-to-machine (M2M) communication. Furthermore, the radio communication apparatus 20 may be a radio communication module (such as an integrated circuit module including a single die) mounted on each of the terminals.

5-1. Application Example Regarding Cooperative Control Node

Figure 15:
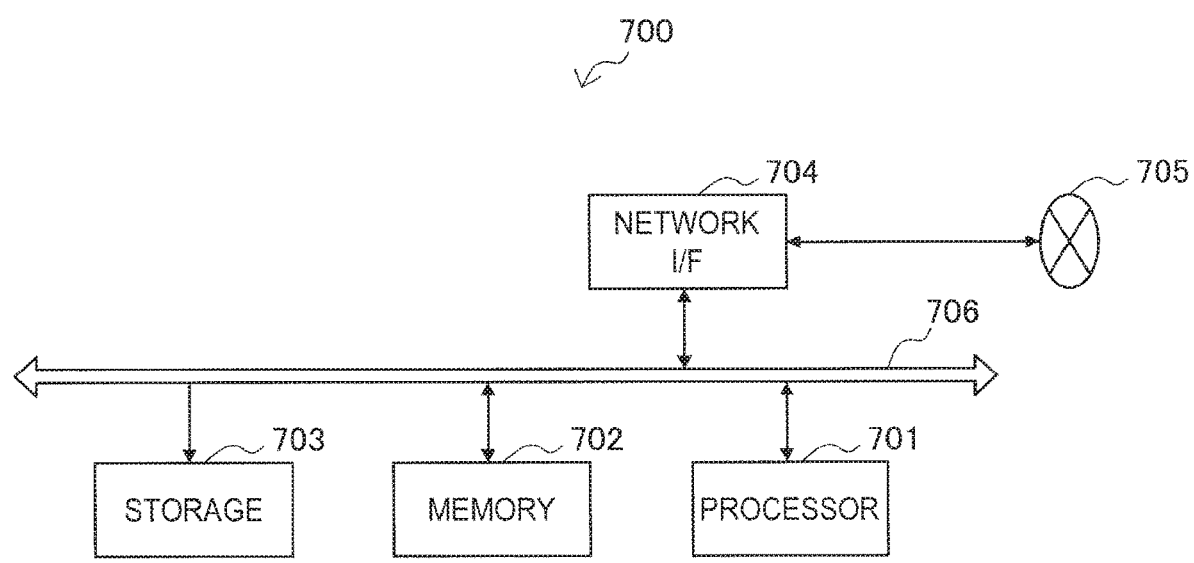
FIG. 15 is a block diagram illustrating a schematic exemplary configuration of a cooperative control node.

FIG. 15 is a block diagram illustrating an example of a schematic configuration of a cooperative control server 700 to which the technology of the present disclosure may be applied. The cooperative control server 700 includes a processor 701, a memory 702, a storage 703, a network interface 704, and a bus 706.

The processor 701 may be, for example, a central processing unit (CPU) or a digital signal processor (DSP), and controls functions of the cooperative control server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the cooperative control server 700 to a wired communication network 705. The wired communication network 705 may be a core network such as an Evolved Packet Core (EPC), or a packet data network (PDN) such as the Internet.

The bus 706 interconnects the processor 701, the memory 702, the storage 703, and the network interface 704 to each other. The bus 706 may be configured to include two or more buses having different speeds (e.g. high-speed bus and low-speed bus).

In the cooperative control server 700 shown in FIG. 15, the cooperative control unit 144 described with reference to FIG. 3 may be implemented in the processor 701. For example, the cooperative control server 700 can support the removal of the self-interference in the master device of the small cell, which makes it possible for the small cells to efficiently use radio resources by utilizing the communication in the FD mode.

5-2. Application Examples Regarding Base Station

Figure 16:
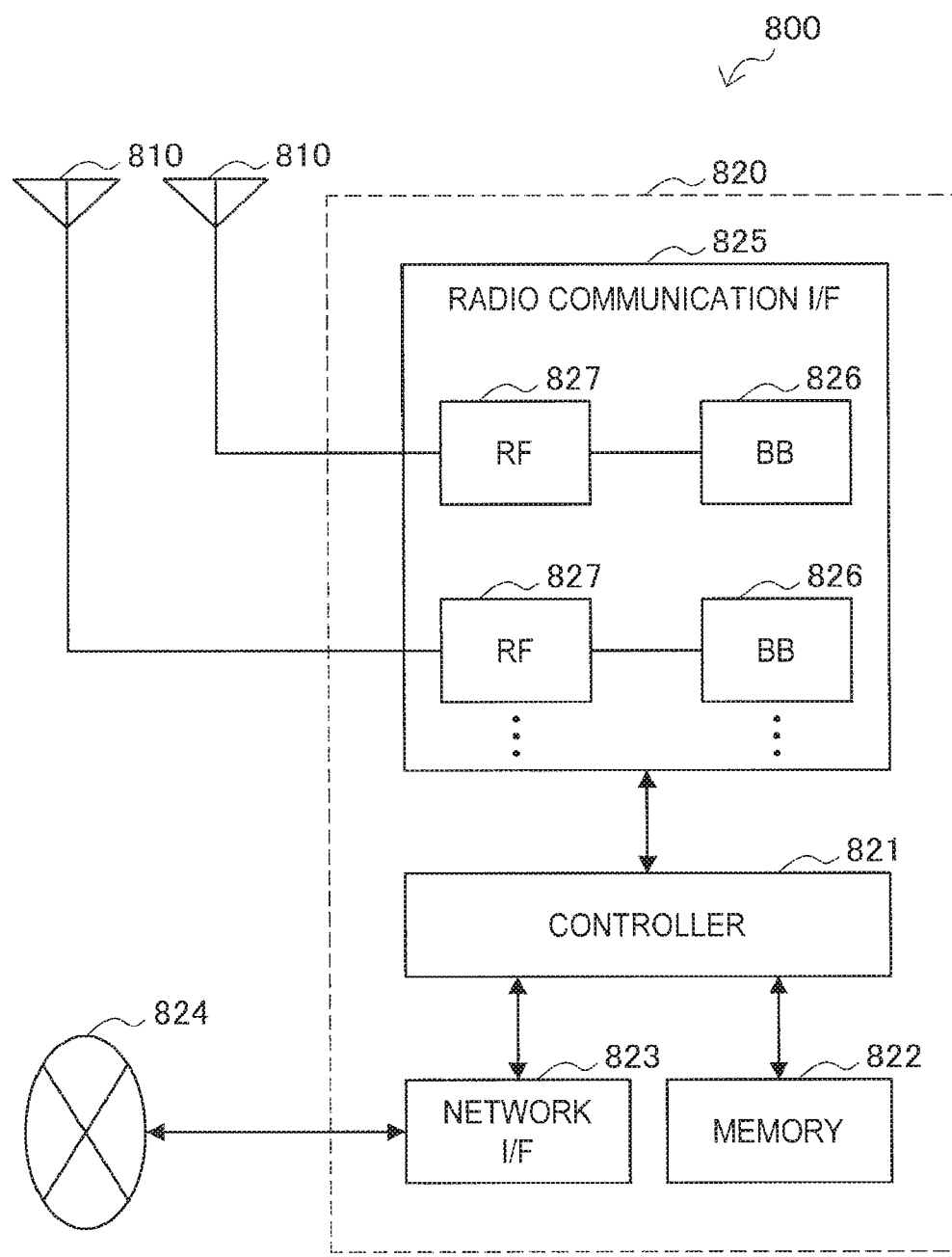
FIG. 16 is a block diagram illustrating an example of a schematic configuration of an eNB.

FIG. 16 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 16. For example, the multiple antennas 810 may be compatible with multiple frequency bands used by the eNB 800. Although FIG. 16 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as LTE and LTE-A, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 16. For example, the multiple BB processors 826 may be compatible with multiple frequency bands used by the eNB 800. The radio communication interface 825 may include the multiple RF circuits 827, as illustrated in FIG. 16. For example, the multiple RF circuits 827 may be compatible with multiple antenna elements. Although FIG. 16 illustrates the example in which the radio communication interface 825 includes the multiple BB processors 826 and the multiple RF circuits 827, the radio communication interface 825 may also include a single BB processor 826 or a single RF circuit 827.

The cooperative control unit 144 described with reference to FIG. 3 may be implemented in the controller 821 of the eNB 800 shown in FIG. 16. Alternatively, the eNB 800 may have the function of the radio communication apparatus 20 described with reference to FIG. 10. In the former case, the eNB 800 can support the removal of the self-interference in the master device of the small cells, which makes it possible for the small cells to use efficiently radio resources by utilizing the communication in the FD mode. In the latter case, in the eNB 800, it is possible to perform the communication in the FD mode while removing the self-interference appropriately.

5-3. Application Examples Regarding Terminal Apparatus

First Application Example

Figure 17:
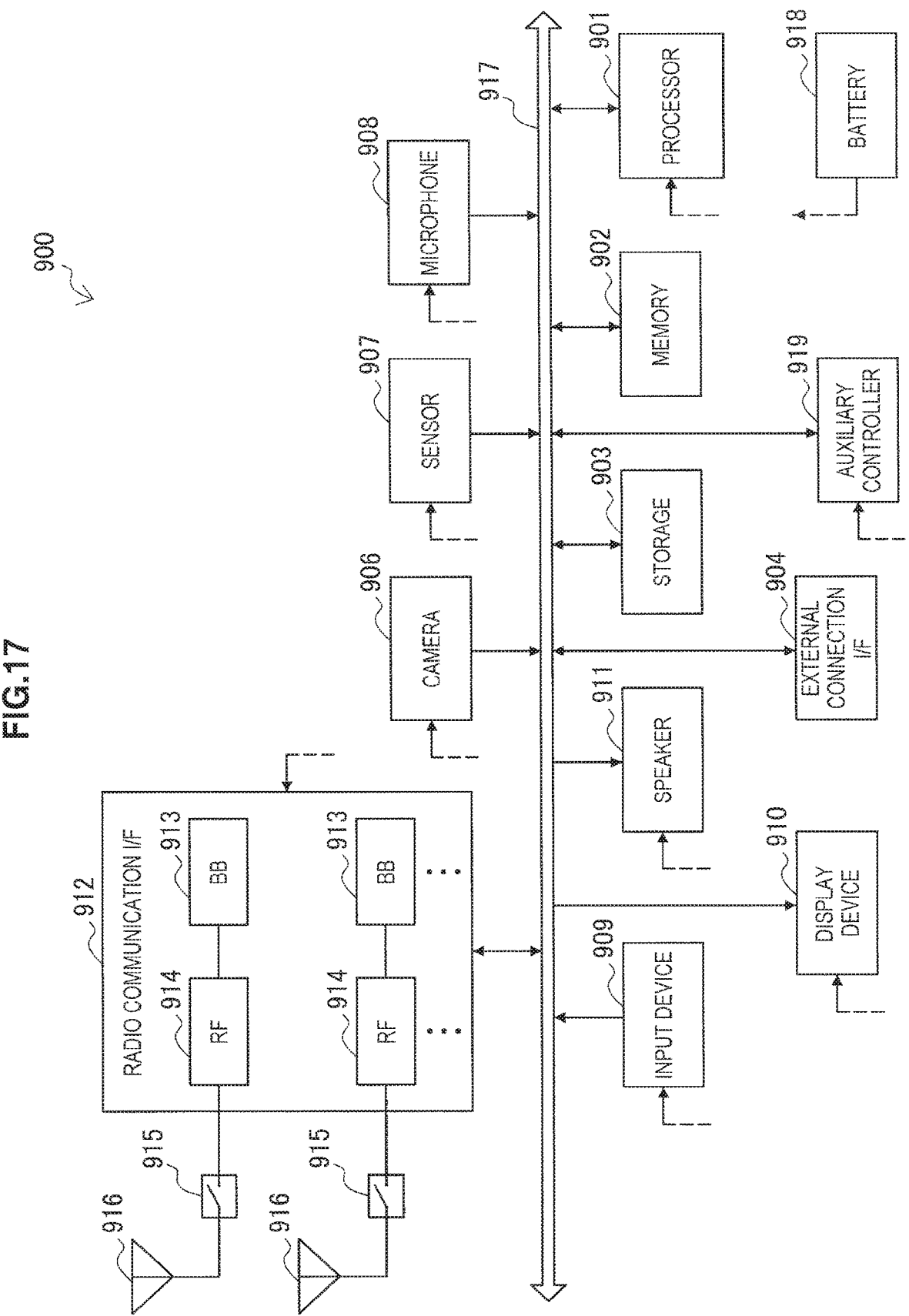
FIG. 17 is a block diagram illustrating an example of a schematic configuration of a smartphone.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-A, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one-chip module that has the BB processor 913 and the RF circuit 914 integrated thereon. The radio communication interface 912 may include the multiple BB processors 913 and the multiple RF circuits 914, as illustrated in FIG. 17. Although FIG. 17 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance radio communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 17. Although FIG. 17 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

The smartphone 900 shown in FIG. 17 may operate as a dynamic AP that forms a local network. In this case, the smartphone 900 may have the function of the radio communication apparatus 20 described with reference to FIG. 10. This allows the self-interference to be removed in the dynamic AP and to execute the communication in the FD mode.

Second Application Example

Figure 18:
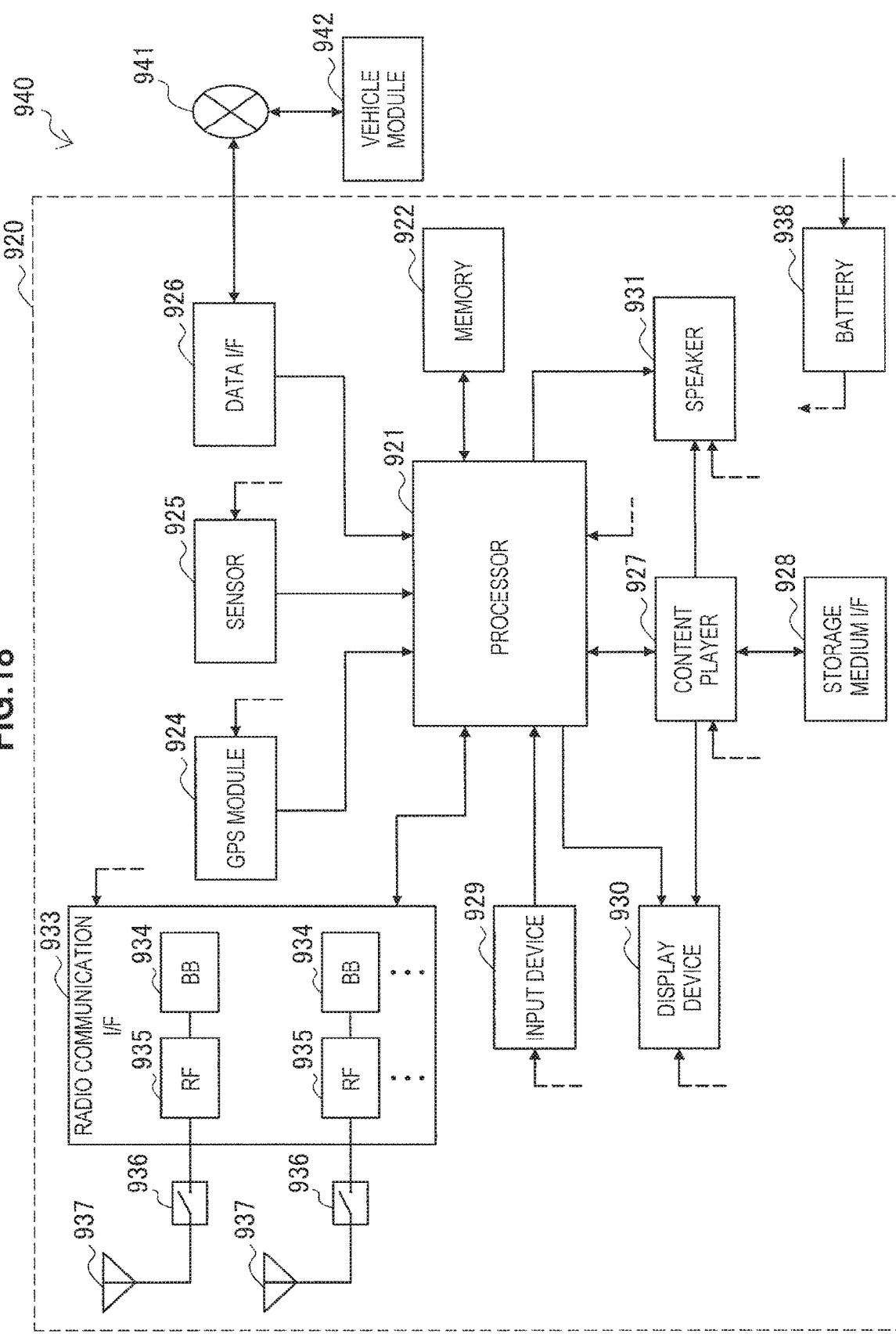
FIG. 18 is a block diagram illustrating an example of a schematic configuration of a car navigation apparatus.

FIG. 18 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-A, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one-chip module having the BB processor 934 and the RF circuit 935 integrated thereon. The radio communication interface 933 may include the multiple BB processors 934 and the multiple RF circuits 935, as illustrated in FIG. 18. Although FIG. 18 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance radio communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 18. Although FIG. 18 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 18 via feeder lines that are partially shown as dashed lines in the figure. The battery 938 accumulates power supplied form the vehicle.

The car navigation apparatus 920 shown in FIG. 18 may operate as a dynamic AP that forms a local network. In this case, the car navigation apparatus 920 may have the function of the radio communication apparatus 20 described with reference to FIG. 10. This allows the self-interference to be removed in the dynamic AP and to execute the communication in the FD mode.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

6. Conclusion

The embodiments of the technology according to the present disclosure have been described in detail with reference to FIGS. 1 to 18. According to the above embodiments, in the radio communication apparatus that is connected to a base station via the radio backhaul link and is connected to one or more terminals via the access link, the communication in the full duplex (FD) mode is performed. Here, the FD mode means that the reception on the radio backhaul link and the transmission on the access link or the reception on the access link and the transmission on the radio backhaul link are performed on the same channel simultaneously. To support the removal of the self-interference due to the leak of the transmission signal from the reception signal in the radio communication apparatus, the power ratio between the reception signal and the transmission signal is adjusted. This makes it possible to avoid events where the SIC technique does not work well due to excessive interference and to reduce the level of interference contained in a desired signal to noise level. Thus, in the environment where a small cell is operated, the efficient use of radio resources by utilizing the FD mode can be achieved, and the system capacity can be increased. For example, the latency for relaying the traffic is reduced. In addition, the memory size that is necessary for the master device of a small cell to buffer the traffic is reduced, and thus the cost for introducing the device can be reduced.

Furthermore, according to the above embodiments, the power ratio described above is adjusted so that the ratio of the power of the transmission signal to the power of the reception signal does not exceed a threshold. In this regard, the threshold may correspond to the upper limit value of the power ratio that can remove the self-interference to the extent in which the reception signal in the master device for relaying the traffic in the FD mode can be appropriately demodulated. Thus, by adjusting the power ratio by using a threshold that matches the interference resistance performance such as SIC capability of the master device, it is possible to support the master device so that the self-interference is reliably removed.

For example, in the uplink, the power ratio between the power of the reception signal from the small-cell terminal on the access link and the power of the transmission signal to the macro-cell base station on the radio backhaul link is adjusted. Typically, the cell radius of the macro cell is larger than the cell radius of the small cell. Thus, the transmission power from the master device tends to become larger in the uplink to the macro-cell base station than the downlink to the small-cell terminal. However, as the above-described embodiments, the adjustment of the power ratio in the FD mode of the uplink makes it possible to effectively operate the SIC technique in the master device of the small cell.

Moreover, according to the above-described embodiments, when the power ratio described above exceeds a threshold, the modulation order applied to the transmission signal can be lowered. Consequently, the power of the transmission signal is reduced. Further, by increasing the resources allocated to the transmission signal, the reduction in the throughput caused by lowering the modulation order can be compensated. Thus, it is possible to suppress the power ratio to the threshold or less without reducing the performance of relaying the traffic. In addition, when it is difficult to increase the resources allocated to the transmission signal, the transmission power of the small-cell terminal on the access link is raised within a range that does not cause harmful interference to a neighboring system. This makes it possible to increase the power of the reception signal on the access link in the master device and to suppress the power ratio to the threshold or less.

Furthermore, according to the above-described embodiments, it is determined whether to execute the radio communication in the FD mode based on the capability of the master device and the load of the system. Thus, if the master device is unable to operate in the FD mode or if the system load is not high, the master device operates in the non-FD mode. Then, the traffic is relayed without use of the SIC technique.

Note that the series of control processing by the respective apparatuses described herein may be implemented by using any of software, hardware, and a combination of software and hardware. Programs constituting the software are previously stored in, for example, a recording medium (a non-transitory medium) provided in the inside or the outside of the respective apparatuses. And the respective programs are, for example, read into a random access memory (RAM) during execution and executed by the processor such as the CPU.

Further, the processes described using the flowcharts in the present description may not necessarily be executed in the order indicated by the flowchart. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control apparatus including:

a communication unit configured to communicate with a radio communication apparatus being connected to a base station via a radio backhaul link and being connected to one or more terminals via an access link; and a control unit configured to, when a reception on the radio backhaul link and a transmission on the access link, or a reception on the access link and a transmission on the radio backhaul link are executed on an identical channel simultaneously in the radio communication apparatus, adjust a power ratio between a reception signal and a transmission signal in order to support the radio communication apparatus in removing self-interference due to a sneak of the transmission signal from the reception signal.

(2)

The communication control apparatus according to (1), wherein the control unit adjusts the power ratio in such a way that a ratio of power of the transmission signal to power of the reception signal does not exceed a threshold.

(3)

The communication control apparatus according to (2), wherein the control unit adjusts the power ratio between the power of the reception signal from the one or more terminals via the access link and the power of the transmission signal to the base station via the radio backhaul link.

(4)

The communication control apparatus according to (3),
wherein the control unit, when the power ratio exceeds the threshold, reduces the power of the transmission signal by lowering a modulation order applied to the transmission signal.

(5)

The communication control apparatus according to (4),
wherein the control unit compensates for a reduction in throughput caused by lowering the modulation order by increasing a resource allocated to the transmission signal.

(6)

The communication control apparatus according to any one of (3) to (5),
wherein the control unit, when the power ratio exceeds the threshold, increases the power of the reception signal by raising transmission power of the one or more terminals.

(7)

The communication control apparatus according to (6),
wherein the control unit raises the transmission power of the one or more terminals within a range that does not cause harmful interference to a neighboring system.

(8)

The communication control apparatus according to (6) or (7),
wherein the control unit, when a resource allocated to the transmission signal is difficult to be increased, raises the transmission power of the one or more terminals.

(9)

The communication control apparatus according to any one of (1) to (8),
wherein the control unit, when capacity of the radio communication apparatus is determined to be necessary to be increased based on at least one of an amount of traffic to be processed by the radio communication apparatus and the number of the terminals, allows the radio communication apparatus to execute the reception and the transmission on an identical channel simultaneously.

(10)

The communication control apparatus according to any one of (1) to (9),
wherein the control unit, when the radio communication apparatus is determined to have corresponding capability, allows the radio communication apparatus to execute the reception and the transmission on an identical channel simultaneously.

(11)

The communication control apparatus according to any one of (1) to (10),
wherein the control unit, when the radio communication apparatus does not execute the reception and the transmission simultaneously, allows the radio communication apparatus to operate the radio backhaul link and the access link in a time division scheme.

(12)

The communication control apparatus according to any one of (1) to (10),
wherein the control unit, when the radio communication apparatus does not execute the reception and the transmission simultaneously, allows the radio communication apparatus to operate the radio backhaul link and the access link in a frequency division scheme.

(13)

The communication control apparatus according to (12),
wherein the radio communication apparatus is a master device being connected to the base station to provide a radio communication service for the one or more terminals, and
wherein a combination of a frequency resource allocated to the radio backhaul link and a frequency resource allocated to the access link is different for each master terminal being connected to an identical base station.

(14)

The communication control apparatus according to (13),
wherein the radio backhaul link is implemented using a beam forming technique.

(15)

A communication control method including:
adjusting a power ratio between a reception signal and a transmission signal in a processor of a communication control apparatus communicating with a radio communication apparatus in order to support the radio communication apparatus in removing self-interference due to a sneak of the transmission signal from the reception signal when a reception on a radio backhaul link and a transmission on an access link, or a reception on the access link and a transmission on the radio backhaul link are executed on an identical channel simultaneously in the radio communication apparatus being connected to a base station via the radio backhaul link and being connected to one or more terminals via the access link.

(16)

A communication control apparatus including:
a radio communication unit configured to communicate with a base station via a radio backhaul link and to communicate with one or more terminals via an access link;
a self-interference processing unit configured to, when a reception on the radio backhaul link and a transmission on the access link, or a reception on the access link and a transmission on the radio backhaul link are executed on an identical channel simultaneously in the radio communication unit, remove self-interference due to a sneak of a transmission signal from a reception signal; and
a control unit configured to allow the radio communication unit to use a power ratio between the reception signal and the transmission signal, the power ratio being adjusted in order to support removal of the self-interference.

(17)

The communication control apparatus according to (16),
wherein the power ratio is adjusted in such a way that a ratio of power of the transmission signal to power of the reception signal does not exceed a threshold, (18)

The communication control apparatus according to (16) or (17),
wherein the radio communication unit includes one or more antennas intended for the radio backhaul link and includes one or more antennas intended for the access link.

(19)

The communication control apparatus according to (18),
wherein the radio communication unit includes at least a transmitting antenna and a receiving antenna intended for the radio backhaul link and includes at least a transmitting antenna and a receiving antenna intended for the access link.

(20)

A communication control method including:
executing a reception on a radio backhaul link and a transmission on an access link, or a reception on the access link and a transmission on the radio backhaul link on an identical channel simultaneously in a radio communication apparatus being configured to communicate with a base station via the radio backhaul link and to communicate with one or more terminals via the access link; and removing self-interference due to a sneak of a transmission signal from a reception signal, wherein a power ratio between the reception signal and the transmission signal is adjusted in such a way that the self-interference is removable from the reception signal.

REFERENCE SIGNS LIST 10 communication control apparatus
110 radio communication unit
120 network communication unit
130 storage unit
142 macro-cell control unit
144 cooperative control unit
20 radio communication apparatus
210 radio communication unit
220 self-interference processing unit
230 storage unit
240 control unit

The invention claimed is:

1. A device for a macro-cell base station, the device comprising:
    circuitry configured to
    communicate with a micro-cell base station being connected to the macro-cell base station via a radio backhaul link and being connected to one or more terminals via an access link; and
    adjust a power of a transmission signal of the micro-cell base station to the macro-cell base station via the radio backhaul link, so that a ratio of the power of the transmission signal to a power of a reception signal received by the micro-cell base station from the one or more terminals via the access link does not exceed a threshold, in order to support the micro-cell base station in removing self-interference between the transmission signal and the reception signal.

2. The device of the macro-cell base station according to claim 1, wherein the threshold is a limit for which the self-interference can be removed to permit demodulation of the reception signal by the micro-cell base station, when the transmission signal and the reception signal are executed simultaneously on an identical channel by the micro-cell base station.

3. The device of the macro-cell base station according to claim 1, wherein the circuitry adjusts the power of the transmission signal via the radio backhaul link.

4. The device of the macro-cell base station according to claim 1, wherein the circuitry, when the ratio reaches the threshold, reduces the power of the transmission signal by lowering a modulation order applied to the transmission signal.

5. The device of the macro-cell base station according to claim 4, wherein the circuitry compensates for a reduction in throughput caused by the lowering of the modulation order by increasing a resource allocated to the transmission signal.

6. A communication control method that is performed by device of a macro-cell base station, the communication control method comprising:
    communicating with a micro-cell base station being connected to the macro-cell base station via a radio backhaul link and being connected to one or more terminals via an access link; and
    adjusting a power of a transmission signal of the micro-cell base station to the macro-cell base station via the radio backhaul link, so that a ratio of the power of the transmission signal to a power of a reception signal received by the micro-cell base station from the one or more terminals via the access link does not exceed a predetermined threshold, in order to support the micro-cell base station in removing self-interference between the transmission signal and the reception signal.

7. The communication control method according to claim 6, wherein the threshold is a limit for which the self-interference can be removed to permit demodulation of the reception signal by the micro-cell base station, when the transmission signal and the reception signal are executed simultaneously on an identical channel by the micro-cell base station.

8. The communication control method according to claim 6, further comprising:
    when the ratio reaches the threshold, reducing the power of the transmission signal by lowering a modulation order applied to the transmission signal.

9. The communication control method according to claim 8, further comprising:
    compensating for a reduction in throughput caused by the lowering of the modulation order by increasing a resource allocated to the transmission signal.

10. A non-transitory computer-readable computer program product containing instructions for causing a device of a macro-cell base station to perform a method for communication control, the method comprising:
    communicating with a micro-cell base station being connected to the macro-cell base station via a radio backhaul link and being connected to one or more terminals via an access link; and
    adjusting a power of a transmission signal of the micro-cell base station to the macro-cell base station via the radio backhaul link, so that a ratio of the power of the transmission signal to a power of a reception signal received by the micro-cell base station from the one or more terminals via the access link does not exceed a predetermined threshold, in order to support the micro-cell base station in removing self-interference between the transmission signal and the reception signal.

11. The non-transitory computer-readable computer program product according to claim 10, wherein the threshold is a limit for which the self-interference can be removed to permit demodulation of the reception signal by the micro-cell base station, when the transmission signal and the reception signal are executed simultaneously on an identical channel by the micro-cell base station.

12. The non-transitory computer-readable computer program product according to claim 10, wherein the method further comprises:
    when the ratio reaches the threshold, reducing the power of the transmission signal by lowering a modulation order applied to the transmission signal.

13. The non-transitory computer-readable computer program product according to claim 12, wherein the method further comprises:
    compensating for a reduction in throughput caused by the lowering of the modulation order by increasing a resource allocated to the transmission signal.

* * * * *